United States Patent
Hartig et al.

(10) Patent No.: US 9,605,887 B2
(45) Date of Patent: Mar. 28, 2017

(54) TRANSPORTABLE PACKAGED ICE SUPPLY SYSTEM FOR HIGH TEMPERATURE ENVIRONMENTS

(75) Inventors: William Hartig, Alexandria, KY (US); Ken Deaton, Batavia, OH (US); Georgi Kazachki, Atlanta, GA (US); Roger Elam, Independence, KY (US)

(73) Assignee: HDT EXPEDITIONARY SYSTEMS, INC., Solon, OH (US)

( * ) Notice: Subject to any disclaimer, the term of this patent is extended or adjusted under 35 U.S.C. 154(b) by 1075 days.

(21) Appl. No.: 13/548,731

(22) Filed: Jul. 13, 2012

(65) Prior Publication Data
US 2013/0180267 A1    Jul. 18, 2013

Related U.S. Application Data

(60) Provisional application No. 61/513,328, filed on Jul. 29, 2011.

(51) Int. Cl.
| | |
|---|---|
| F25D 25/04 | (2006.01) |
| F25C 5/00 | (2006.01) |
| F25C 1/00 | (2006.01) |
| F25B 7/00 | (2006.01) |
| F24F 5/00 | (2006.01) |
| F25B 9/00 | (2006.01) |

(52) U.S. Cl.
CPC ............ *F25C 5/002* (2013.01); *F24F 5/0017* (2013.01); *F25B 7/00* (2013.01); *F25B 9/002* (2013.01); *F25C 1/00* (2013.01); *Y02E 60/147* (2013.01)

(58) Field of Classification Search
CPC .... F25C 5/002; F25C 1/00; F25C 1/04; F25C 1/12; F25C 2400/14; F25C 2700/14; F25B 9/002; F25B 7/00; F24F 5/0017; Y02E 60/147

USPC .......................................................... 62/380
See application file for complete search history.

(56) References Cited

U.S. PATENT DOCUMENTS

| | | | |
|---|---|---|---|
| 2,528,795 A | 11/1950 | Shontz | |
| 3,779,029 A * | 12/1973 | Larriva | ..................... F25C 1/00 62/138 |
| 4,027,495 A | 6/1977 | Edwards | |

(Continued)

FOREIGN PATENT DOCUMENTS

| | | |
|---|---|---|
| CN | 101690902 | 4/2010 |
| CN | 101865589 | 10/2010 |

(Continued)

OTHER PUBLICATIONS

International Preliminary Report on Patentability of PCT/US2012/048779 mailed on Feb. 13, 2014, 9 pages.

(Continued)

*Primary Examiner* — Ryan J Walters
*Assistant Examiner* — Steve Tanenbaum
(74) *Attorney, Agent, or Firm* — Fay Sharpe LLP

(57) ABSTRACT

Embodiments of the present technology are directed to devices, systems, and methods of delivering ice under high ambient temperatures. A transportable container houses an air-conditioning system with a cascade heat exchanger coupling the air-conditioning system with a separate refrigeration system in the container. The separate refrigeration system provides cooling energy for a cooling device while rejecting a heat load to the air-conditioning system for rejection to ambient temperatures.

8 Claims, 10 Drawing Sheets

(56) References Cited

U.S. PATENT DOCUMENTS

| | | | |
|---|---|---|---|
| D275,958 S | 10/1984 | Burns | |
| 4,594,858 A | 6/1986 | Shaw | |
| 4,748,820 A | 6/1988 | Shaw | |
| 4,787,211 A | 11/1988 | Shaw | |
| 4,947,655 A | 8/1990 | Shaw | |
| 5,138,842 A | 8/1992 | Wruck et al. | |
| 6,131,401 A * | 10/2000 | Ueno | A47F 3/04 165/208 |
| 6,266,945 B1 | 7/2001 | Schroeder | |
| 6,289,684 B1 | 9/2001 | Guidry, II et al. | |
| 6,298,683 B1 * | 10/2001 | Kondo | F25B 7/00 62/335 |
| 6,393,858 B1 * | 5/2002 | Mezaki | F24F 3/065 62/278 |
| 6,557,361 B1 | 5/2003 | Howard | |
| 6,884,016 B2 | 4/2005 | Ogle et al. | |
| 6,912,873 B2 | 7/2005 | Sanders | |
| 6,932,124 B2 | 8/2005 | Dalton et al. | |
| 7,104,291 B2 | 9/2006 | Dalton et al. | |
| 7,343,965 B2 * | 3/2008 | Memory | F28D 9/005 165/166 |
| 7,426,945 B2 | 9/2008 | Dalton et al. | |
| 7,806,152 B2 | 10/2010 | Dalton et al. | |
| 2003/0106327 A1 * | 6/2003 | Zevlakis | F25C 1/04 62/74 |
| 2004/0134219 A1 | 7/2004 | Miller et al. | |
| 2006/0123805 A1 | 6/2006 | Yuzawa | |
| 2008/0155993 A1 | 7/2008 | Kuehl | |
| 2008/0156034 A1 * | 7/2008 | Cur | F25B 25/00 62/449 |
| 2009/0000299 A1 | 1/2009 | Ast et al. | |
| 2009/0288437 A1 * | 11/2009 | Matsuoka | F25B 9/008 62/238.6 |
| 2009/0293507 A1 * | 12/2009 | Narayanamurthy | F24F 5/0017 62/59 |
| 2010/0024363 A1 | 2/2010 | Pape | |
| 2010/0077788 A1 | 4/2010 | Lewis | |
| 2011/0120168 A1 | 5/2011 | Choi et al. | |
| 2011/0138849 A1 | 6/2011 | Hirano et al. | |
| 2012/0123095 A1 | 5/2012 | Ton et al. | |

FOREIGN PATENT DOCUMENTS

| | | |
|---|---|---|
| GB | 894011 | 1/1959 |
| JP | 2002-206845 | 7/2006 |
| WO | 02/057696 A1 | 7/2002 |
| WO | 2010/138664 A1 | 12/2010 |
| WO | 2011/056824 A2 | 5/2011 |

OTHER PUBLICATIONS

International Search Report and Written Opinion of PCT/US12/48779 mailed on Oct. 26, 2012, 14 pages.

Parekh, A., et al., Numerical Simulation of R410a-R23 and R404A-R508B Cascade Refrigeration System,: World Academy of Engineering and Science, Engineering and Technology, vol. 46, 2010, 5 pages.

Alhamid, D., et al., "Exergy and Energy Analysis of a Cascade Refrigeration System Using R744+R170 for Low Temperature Applications," International Journal of Mechanical & Mechatronics Engineering IJMME-IJENS, vol. 10, Dec. 2010, 8 pages.

* cited by examiner

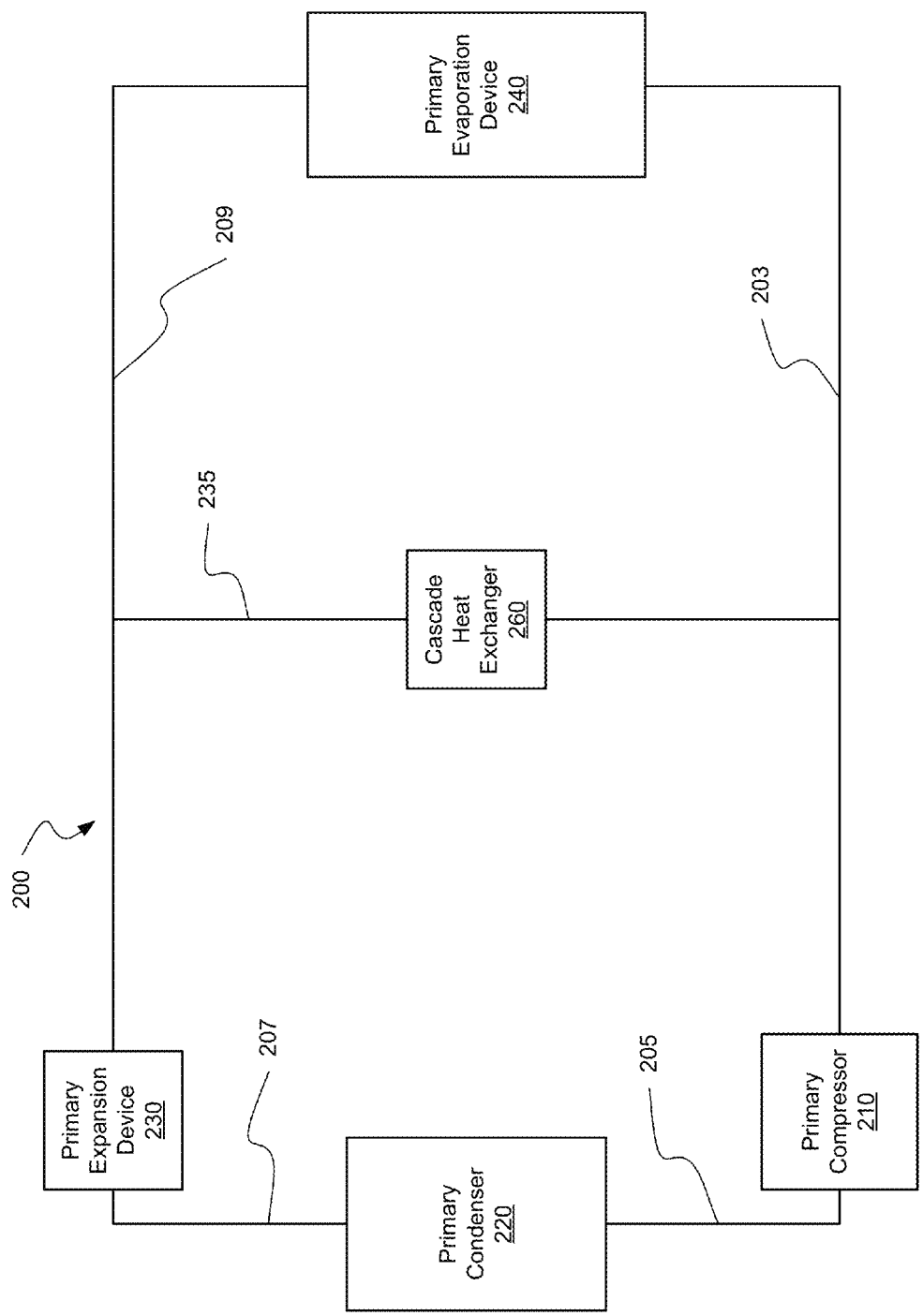

TRANSPORTABLE PACKAGED ICE SUPPLY SYSTEM FOR HIGH TEMPERATURE ENVIRONMENTS

CROSS-REFERENCES TO RELATED APPLICATIONS

This application is related to and claims the benefit of, under 35 U.S.C. §119(e), U.S. Provisional Pat. App. Ser. No. 61/513,328 titled "ICE SUPPLY SYSTEM." The Provisional application was filed on Jul. 29, 2011, and is herein incorporated by reference in its entirety for all purposes.

BACKGROUND

Scientific exploration, mining operations, commercial operations, and standard or contract military operations occur throughout the world, and require food, beverage, medical supplies, sensitive equipment, and ways of preserving them. When these operations take a unit or deployment far from a base location, deliveries of supplies may not occur with regularity. Especially in desert locations, the ability to keep a cold environment for food, beverage, medical supplies, and testing samples and equipment requires a significant amount of energy for cooling and storage.

Additionally, a supply of ice can be required, but difficult to obtain. In many instances, ice supplies may be obtained by contracting with a commercial ice operation in a neighboring city or town. Even with such a contract, the costs associated with transporting the ice and delivering it to forward operations can be substantial, not to mention dangerous. Moreover, the time required to deliver the ice can often result in only realizing seventy percent or less of the total purchased ice due to melting during transportation and delivery. Even when the ice is delivered, a unit may be limited in the amount of cold-storage available for the ice, reducing the possible supplies. What is needed are ways of allowing an individual unit to produce their own ice supplies, and maintain them until the ice is needed. Embodiments of the technology disclosed herein address these and other problems.

BRIEF SUMMARY

The present technology is directed to devices, systems, and methods of delivering ice under high ambient temperatures. Embodiments utilize cascade heat exchangers for transferring a heat load from a refrigeration system to an air-conditioning system for rejection to ambient.

One embodiment of the technology is a transportable ice-delivery device. The device is a container that houses an air-conditioning system for cooling the container. The device also houses an ice maker that produces ice and may be located above a bagger. The bagger may collect quantities of the produced ice for transport to a merchandiser. The container may also house a merchandiser for storing the bag of ice, and a conveyance system for transferring the bags of ice from the bagger to the merchandiser.

The technology further includes a cooling machine having closed refrigeration circuits. The machine may include a primary closed refrigeration circuit for rejecting a primary heat load in ambient conditions above 120° F. may include a primary compressor, a primary condenser, a primary expansion device, and a primary evaporation device. The primary closed refrigeration circuit may also include a cascade heat exchanger that allows a portion of a primary refrigerant in the primary closed refrigeration circuit to exchange heat loads alternative to the primary evaporation device. The cooling machine may also include a secondary closed refrigeration circuit having a secondary compressor, a secondary condenser, a secondary expansion device, and a secondary evaporation device. The cascade heat exchanger may operate as the secondary condenser to transfer a secondary heat load produced in the secondary closed refrigeration circuit to the primary refrigeration circuit. The secondary heat load may be transferred from a secondary refrigerant contained in the secondary closed refrigeration circuit to the primary refrigerant so that it can be rejected from the primary condenser.

The technology may further include methods of rejecting heat in a container. The methods may include transferring a first heat load with a container air-conditioning refrigeration system that cools an internal space of the container, and has a first refrigerant. The method also may include transferring a second heat load with a cooling refrigeration system located within the internal space that provides cooling energy for a cooling device located in the space. The cooling refrigeration system may have a second refrigerant. The method still further may include removing the second heat load from the cooling refrigeration system to the container air-conditioning refrigeration system through a cascade heat exchanger. The cascade heat exchanger may exchange the second heat load from the second refrigerant in the cooling refrigeration system to the first refrigerant in the container air-conditioning refrigeration system without allowing the first refrigerant and the second refrigerant to come into fluid contact. The method also may include rejecting both the first heat load and second heat load from the container air-conditioning refrigeration system to ambient air.

Additional embodiments and features are set forth in part in the description that follows, and in part will become apparent to those skilled in the art upon examination of the specification, or may be learned by the practice of the disclosed embodiments. The features and advantages of the disclosed embodiments can be realized and attained by means of the instrumentalities, combinations, and methods described in the specification.

BRIEF DESCRIPTION OF THE DRAWINGS

FIG. 2A shows a box diagram and piping schematic of a primary refrigeration circuit according to embodiments of the present technology.

In the appended figures, similar components and/or features may have the same numerical reference label. Further, various components of the same type may be distinguished by following the reference by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

In the following description, for the purposes of explanation, numerous details are set forth in order to provide an understanding of various embodiments of the present technology. It will be apparent to one skilled in the art, however, that certain embodiments can be practiced without some of these details, or with additional details.

I. Transportable Ice-Delivery Device

In one embodiment of the present technology, a transportable ice-delivery device is described. The device may be a container that houses an air-conditioning system for cooling the container. The device may also house an ice maker that produces ice, and a bagger that is located in communication with the ice maker. The bagger may collect quantities of the produced ice in a bag for transport to a merchandiser. The container may also house a merchandiser for storing the bag of ice, and a conveyance system for transferring the bag of ice from the bagger to the merchandiser.

Figure 1A:
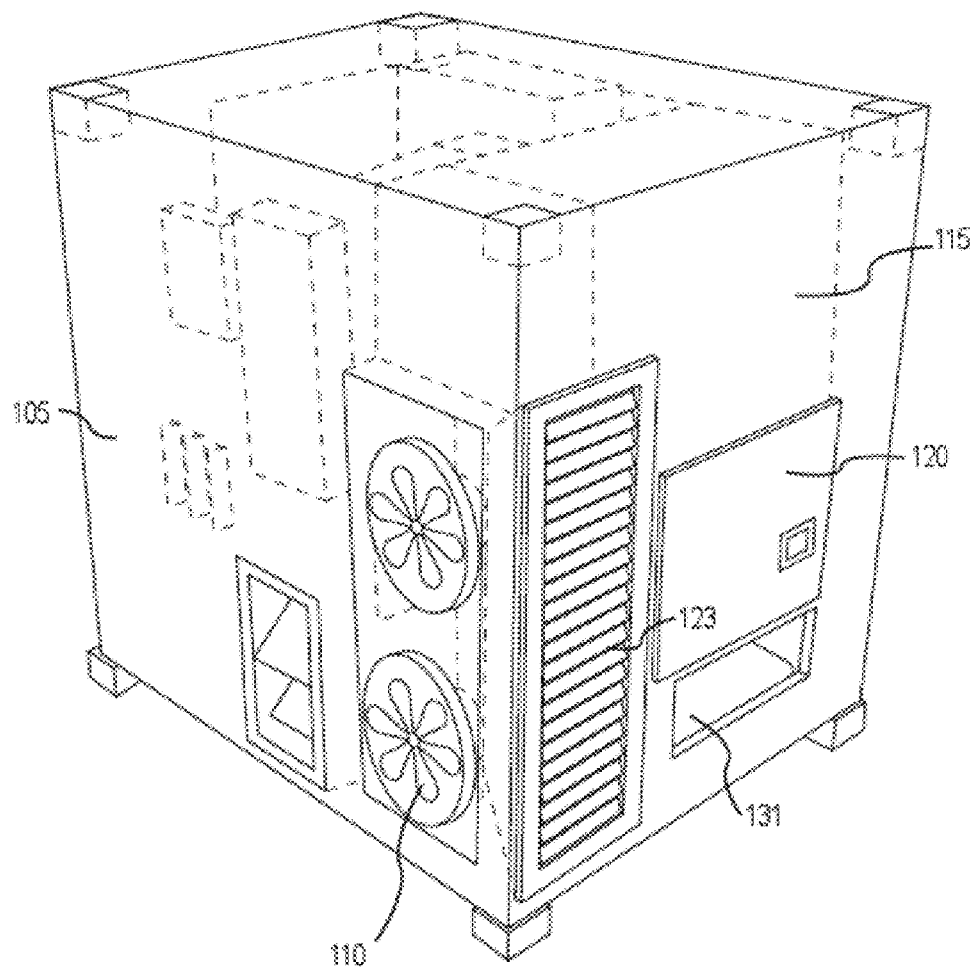
FIG. 1A shows a perspective view of a container according to embodiments of the present technology.
Figure 1B:
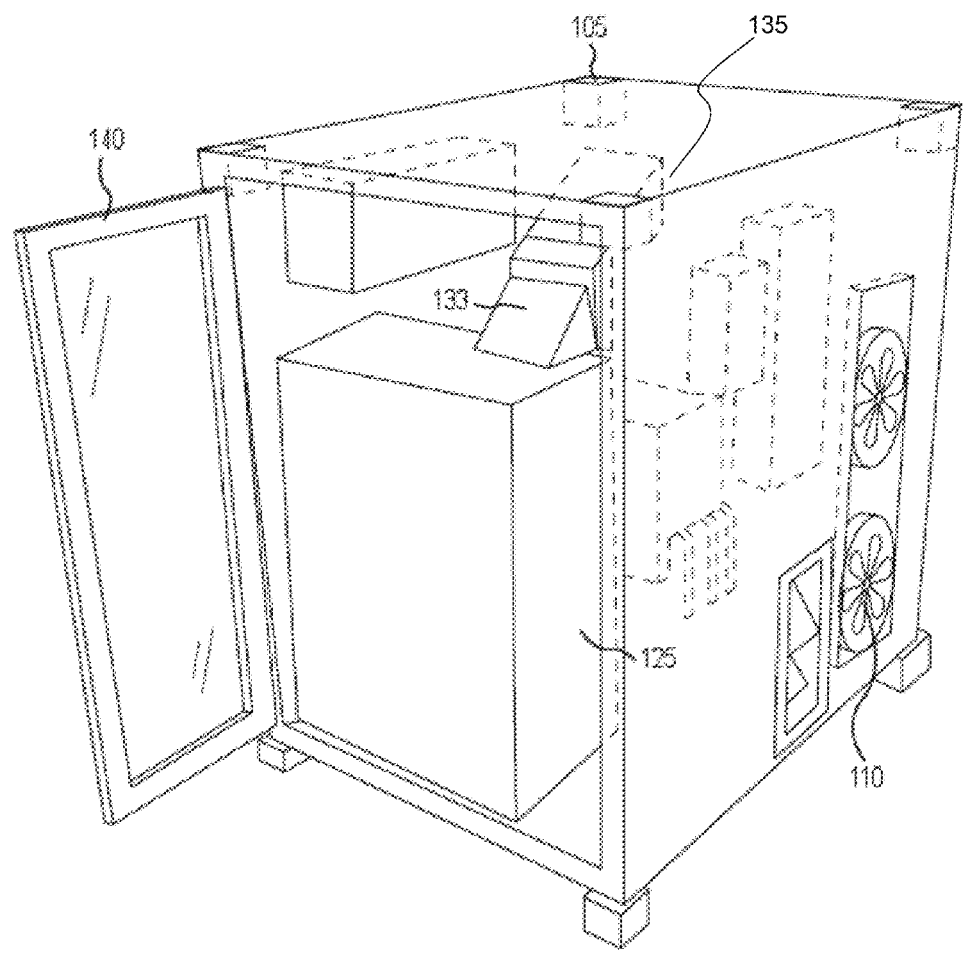
FIG. 1B shows another perspective view of a container according to embodiments of the present technology.

FIGS. 1A and 1B show perspective views of a container according to embodiments of the present technology. FIG. 1A shows the container 105 and views of several of the internal components. The container may house all of the systems and components in that each component is completely within the dimensions of the container. Although certain components, such as the condenser of the primary refrigeration circuit for example, can be exposed to ambient air in order to function as designed and are thus not enclosed by the container, each component may reside within the overall dimensions of the container itself. Thus, no component may be attached to the outside of the container or reside completely outside of the dimensions of the container. In other embodiments, no component or system extends beyond the outer dimensions of the container during transportation, or alternatively during normal operation. Components can have access panels or doors that can be opened for maintenance or operation, for example, where the door when opened extends beyond the dimensions of the container, although when in normal operation, refrigeration components may be located within the dimensions of the container. Alternatively, certain features may protrude beyond the base dimensions of the container.

The container may be a standard container of any standard ISO dimension that can be used in freighting the device components. In some embodiments, the container may include one or more housings that incorporate the equipment and systems described in detail below. When multiple housings are used, the housings may be mechanically coupled or alternatively be remotely located from one another with fluid couplings between the separated housings. The container may be a compact triple container ("TRICON"), and in other embodiments a compact TRICON that may be modified for increased structural integrity or added dimension. For example, the compact TRICON can have overall dimensions that are 6.5 feet wide by 8 feet deep by 8 feet high. The container can have additional attachable panels for protection of components that are exposed, such as the condenser coil, and the panels can be used only during transportation or during operation. In other embodiments the container can have louvers attached to allow air venting or draw-in, but protect the access points from debris or foreign objects. The inside of the container can be modified to minimize condensation and water collection inside the device. Channels that slope and are directed outside of the device or toward a drain can limit the amount of water retained inside the device to prevent mold and mildew formation. Desiccants can be used to help remove internal moisture, and can be in the form of a composition placed or included in the device, or a wheel used to remove moisture in different embodiments. The container can also be treated to limit rusting, and other corrosion associated with humid, toxic, or other corrosive environments.

The container 105 may house several components that can include, as shown in FIG. 1A, condenser fans 110, an ice maker 115, and a bagger 120. A conveyor system can also be housed in the container with a first position shown by a conveyor belt 131. The container 105 may also contain all of the operating systems for each of the components. Thus, the refrigerant system for the ice maker 115 may also be contained within the container 115. A condenser coil 123 can be exposed to the ambient, or protected by louvers or other panels in different embodiments. Several of the described systems and devices may have subsystems and components that are also located within the container 105. For example, the air-conditioning system may include a fan mounted internally within the container, and this fan is located within the container. All piping and process components located within the container 105 may be accessed via access panels or doors on the container itself, so that no component needs to reside externally to the container.

FIG. 1B shows an alternate perspective view of the container 105 that shows a door 140 which provides access to a merchandiser 125 for storing the bag of ice. The door 140 may extend along the container as shown, or alternatively may be a smaller door providing direct access to ice in the merchandiser. The conveyor system (not shown) can have a second position that may include a slide or tipping mechanism 133 at which a bag of ice can be dropped or caused to fall into the merchandiser 125 for cold storage prior to use. The conveyor system can transfer a bag of ice from the first position to the second position for delivery into the merchandiser 125.

The air-conditioning system may be used to cool the internal space of the container 105. The air-conditioning system can include an air-cooled style condenser in which the condenser 110 rejects the heat load to the ambient air. The condenser can be located along the exterior of the container 105, and may still reside within the outer dimensions of the container. The evaporation side of the air conditioning system can be located within the container, and coupled with an internal fan for providing cool air to the internal space of the container.

The ice maker 115 may be located within the container 105 and may provide ice that can be in cubes, blocks, crescents, or in other useful shapes and sizes for various purposes. The ice maker 115 may be located above the bagger 120, or a bagging device, to deliver the produced ice directly into the bagger 120 to make bags of ice, or alternatively includes an additional transport mechanism that may deliver ice to the bagger. The bagging device may be below the ice-maker, or otherwise in communication with the ice maker for receiving ice delivered by the ice-maker to be grouped into bags of a predetermined size. The ice maker 115 can be a commercial style ice-making device that is modified to operate within the requirements of the container. For example, many commercial ice makers include an air-cooled condenser. The air-cooled condenser may be removed from the refrigerant system of the ice maker, and the high side of the refrigerant system can be coupled with the internal air-conditioning system. The bagger 120 can include a weighing device for weighing particular quantities of ice prior to collecting them in a bag. In one embodiment, the ice bag can be held by the weighing device such that when a preset amount of ice falls into the bag from the ice maker 115, the bagger 120 stops collecting the ice. Alternatively, the bagger 120 may include a storage bin in communication with the ice maker 115, such that produced ice is collected in the storage bin of the bagger 120. The ice may then be directed into a bag. An exemplary bagger 120 may include a sensor, such as an optical sensor, that provides an indication of ice that is directed into a bag. The sensor may be preset to instruct the bagger to cease delivery of ice to a bag once a predetermined amount of ice has been provided. The sensor may be manually or remotely adjusted to provide tolerance for any required amount of ice delivery.

The bagger 120 can heat-seal a bag of ice after the predetermined weight or amount of ice has been reached, or when a desired height of ice has been filled, and then transfer the bag of ice to the conveyor system. The bagger 120 can be set to collect any amount of weight of ice in a bag, which can be based on the size and holding volume of the bags being used. In one embodiment, bags may hold ten pounds or ice. Alternatively, the bags may hold more or less than ten pounds of ice. Alternatively, a bag may be provided that holds about twenty or about thirty pounds of ice, about forty pounds, about fifty pounds, etc., or more, and the bagger 120 may be operated such that when thirty pounds of ice have been deposited in the bag, the bagger heat seals the bag and transfers the bag of ice to the conveyor system. As would be understood by one of skill in the art, more or less ice can be bagged in different embodiments. In some embodiments the bagger 120 can trigger the ice maker 115 to stop making ice when the bag has been filled with the preset amount of ice. In other embodiments, the ice maker 115 continues to produce ice until operation has been stopped based on a volume of ice in the merchandiser. The bagger 120 may be configured to bag ice as long as enough ice resides in the collection bin to fill at least one bag. The collection bin may include a sensor, such as an optical or weight sensor, that maintains a cycle of bagging when at least one bag worth of ice resides within the collection bin.

Because of the nature of the ice forming process, the ice maker 115 can be configured to continually produce ice based on a timing operation that provides adequate time to elapse between deliveries of ice to the bagger 120 such that the bagger 120 has sufficient time to seal a bag of ice, deliver it to the conveyor system, and prepare a subsequent bag for delivery of ice. Alternatively, the collection bin of the bagger, or hopper, may be sized to provide ample storage for ice that may fill multiple bags in order to allow ice production to continue regardless of the amount of ice in the collection bin. For example, the collection bin, or hopper, may receive all ice from the ice maker, which can be about 45 pounds of ice per production cycle in one embodiment. The collection bin may be sized to have the capability to maintain 1, 2, 3, 4, 5, etc., or more cycles worth of ice produced by the ice maker. The collection bin can then deliver ice to the bagger 120 for the required bagging amounts. The collection bin may include an auger or ice movement device to both deliver ice to the bagger, and to help prevent the individual ice pieces from agglomerating into an ice block. The collection bin may include any number of sensors that provide indication of whether sufficient ice is available for bagging, when a bag is full, whether a full bag has been released, etc.

After the bagger 120 has sealed the bag of ice, the bag can be transferred to the conveyor system. A solenoid may control the release of a bag of ice, and may be triggered based on a heat seal mechanism that finishes a cycle of sealing a bag. In one embodiment, the conveyor system is in communication with both the bagging device and the merchandiser and configured to transport the bag of ice between a first position near the bagger and a second position near the merchandiser 125. In some embodiments, the first position is located at least partially below the bagger 120 and the second position is located above or in communication with an upper portion or the merchandiser 125. The conveyor system may include a horizontal belt 131 and an elevator 135. The bagger 120 may deliver the bag of ice onto the horizontal transport belt. In some embodiments, the horizontal transport belt may have a support structure to ensure that the bag of ice does not fall off the horizontal transport belt onto the floor of the container. The support structure can be, for example, a raised support structure on the sides of the belt. Once the bag of ice has been delivered to the horizontal transport belt, the bag of ice can be moved to an intermediate position between the first position at the belt 131 and the second position. In some embodiments, the horizontal transport belt is operated only after a bag of ice has been dropped thereon in order to conserve the energy needed to continuously run the belt. Alternatively, the horizontal transport belt may begin operation prior to receiving a bag of ice, and may cease operation after delivering the bag of ice to the intermediate position. By operating prior to receiving a bag of ice, the transport belt may be configured to cause a bag of ice to fall to a prone position to allow the bag of ice to be delivered below the bagger and other devices. The horizontal transport belt may be stopped when a sensor provides an indication that the bag of ice has been properly positioned on the elevator 135.

After the bag of ice has been moved from the first position to the intermediate position, the bag is received by the elevator 135. The intermediate position may be located below the second position, and the elevator 135 may bring or transfer the bag of ice from the intermediate position to the second position. The elevator can accept the bag from the horizontal transport belt in various ways. In some embodiments, the horizontal belt deposits the bag of ice onto a shelf or other support structure on the elevator. Once the bag of ice is positioned on the elevator, the bag of ice can be brought to the second position. The elevator may begin operation prior to receiving a bag of ice, and may cease operation after delivering a bag. Alternatively, the elevator may be engaged after the bag of ice has been deposited thereon.

Once the bag of ice has reached the second position, it may be dropped, or a tipping mechanism may drop the bag of ice, or force it to fall, into the merchandiser. Exemplary structures may position the elevator such that after a bag of ice has reached the apex of elevation, the elevator delivers the bag to the merchandiser from above, and no additional tipping mechanism is utilized. Alternatively, the tipping mechanism may be located relative to the second position so that the tipping mechanism causes the bag of ice to fall from the upward transport mechanism into the merchandiser. In some embodiments the tipping mechanism can be a plate or plane angled toward the merchandiser on which the bag of ice is deposited by the upward transport mechanism. In still other embodiments the tipping mechanism engages the elevator to force the bag of ice from the elevator, which drops the bag of ice or causes it to fall into the merchandiser. In some embodiments the tipping mechanism is also motorized, and can engage when the bag of ice reaches the second position to cause the bag to fall into the merchandiser.

An alternative elevator may include one shelf or a support member mechanically coupled with a vertical transport mechanism that receives the bag of ice and delivers it to the second position. The second position may be monitored by a sensor. Once the sensor indicates that a bag of ice has been delivered to a proper position by the elevator, the elevator shelf may be operated to drop to a predetermined position that delivers the bag to the merchandiser. The shelf may drop to an angle below horizontal that causes the bag to be delivered gravitationally to the merchandiser. A linkage coupling or other connection mechanism may support the shelf or support member when engaged and provide the operation to drop the shelf at a certain angle when disengaged. When engaged, the linkage coupling may maintain the support member in a substantially horizontal position, and when disengaged the support member may be declined to an angle below horizontal. After the bag of ice has fallen from the shelf, the elevator motor may be reversed to return to the intermediate position where a subsequent bag of ice may be received. Alternatively, the elevator may include at least one additional shelf that may be located at an opposite position on a continuous belt from the first shelf. In operation, when the first shelf having a bag of ice is delivered to the second position, the second shelf may be moved into the intermediate position to receive a subsequent bag of ice. In this way, the motor need not be reversed, and the elevator can be operated in a single direction for each bag of ice delivered to the merchandiser.

The merchandiser 125 may be used to store the ice after it has been produced and collected in a bag. The merchandiser may be maintained at a temperature below 32° F. in order to ensure that the ice does not melt prior to use. In some embodiments the merchandiser has at least two defined openings that can have doors in order to maintain the environment temperature. One opening can be located facing towards the outside of the device or container, and can be located in line with the container door 140. Thus, when the door to the container is opened, the merchandiser door can be subsequently opened so that a bag of ice can be extracted for use. Alternatively, the merchandiser is located within the unit such that opening the container door 140 provides direct access to the merchandiser. The door may include gasketing, sealing, or flashing mechanisms for reducing or preventing energy loss from the merchandiser opening. By providing multiple doors, a temperature barrier or curtain can be provided for the merchandiser. In some embodiments, the ambient temperature outside of the container can be well over about 100° F., or even over about 130° F. The merchandiser, on the other hand, may be kept below 32° F., and thus much cooling energy can be lost from the merchandiser system. However, because the container may also have an internal air-conditioning refrigeration system providing cool air to the container, an intermediate temperature air curtain can be developed between the outside ambient and the merchandiser. Such a design can also help to reduce the amount of condensation or sweating that develops around the merchandiser. Alternatively, the internal air-conditioning system provides an environment within the container such that no directed air curtain is produced, and the merchandiser may be cooled in a way similar to other internal components.

The merchandiser 125 can have a second opening located at the top of the merchandiser for accepting a bag of ice from the conveyance system. In alternative embodiments, the second opening is located at the back of the merchandiser for the deposit of ice bags. In either case, the second opening faces inside or towards an interior portion of the container for receiving the bag of ice, and may or may not have a door, or flaps, or any barrier between the merchandiser and the interior of the container to reduce cooling losses. The second opening can have a trap door or similar way of maintaining the integrity of the merchandiser environment, but provide a way of accepting a bag of ice. For example, the opening can be located at the top of the merchandiser and the opening can be covered by a trap door. When a bag of ice is caused to fall to the merchandiser, the weight of the bag can trigger the trap door to release providing access to the merchandiser. In some embodiments the trap door is operated by springs or another mechanism causing a tension on the door to maintain it in the closed position. However, the weight of the bag of ice can overcome that tension and thereby release the door, which is subsequently re-engaged by the spring or mechanism. The merchandiser may have one or more sensors that indicate when the merchandiser is full. For example, the merchandiser may be capable of holding about 1, about 5, about 10, about 15, about 20, about 30, about 40, about 50, about 60, about 70, about 80, etc., or more bags of ice depending on the size. Alternatively, the merchandiser may be capable of holding an equivalent weight of ice, and may be capable of holding about 10 pounds or ice or more. The merchandiser may also be configured to hold about 20, 30, 50, 70, 100, 150, 200, 300, 400, 500, 750, 1000, etc., or more pounds of ice. Once the maximum amount of bags has been delivered to the merchandiser, a sensor may trigger the production of ice to stop. The sensors may be based on the number of bags delivered, or some other metric including the height of bag fill in order to account for bags of ice that may be removed from the merchandiser for use. Restacking or removal of ice bags may trigger the sensors to resume all ice production systems.

Along the exterior of the container can be inlets for receiving power and water from various sources. Internal conduits can provide power from the main inlet to each of the components requiring a power source including each of the component systems described thus far as well as a control system as will be explained below. The power can be provided from any available source, and can include general DC or AC power sources including electrical, solar, wind, etc. that provide adequate output power, and for example can be single or three-phase 115, 120, 208, 230, 240, 280, 460, 480, or 600 VAC, or between about 205 and 475 VDC. Alternatively the power source can be from generators that provide output power that can be more than or about 60 kW, or alternatively about 50 kW or less, or about 40 kW, 30 kW, 25 kW, 20 kW, 15 kW, 12 kW, or about 10 kW or less. In one embodiment a military-style generator set rated at 15 kW can be used to power the ice-delivery device and all internal components. The generator may provide 208/230 VAC, 3 phase, 60 Hz power to the device that may then be directly utilized or converted into other current ratings for use, such as 115 VAC internally. By operating components only when needed, such as the conveyor system for example, a lower-rated power source may be utilized for the device. Advantageously, by utilizing a 15 kW power source, the step up to a higher-rated power source may be avoided, which can be especially useful in light of the fact that the next available generator source size is often 25 kW or 30 kW.

The container and individual components can be reinforced, and structural enhancements can be integrated for various uses of the device. In some embodiments, the device can be transported by military vehicle to remote locations. In these situations, components fastened for other operations can become dislodged within the device. Thus, components such as compressors can be further bracketed and supported for transportation. In exemplary containers, shock-absorbing components can be installed including reinforcement for transportation and can include flexible supports such as neoprene or rubber pads. The container may be designed to be air-lifted and deposited, and thus the internal components and container are reinforced to withstand the shock of such movement, which can include tipping and drops of up to a foot or more. In alternative embodiments, the container is rigged on a military transport vehicle, such as a HEMTT, or HEMTT LHS vehicle. The reinforced container and components allow the device to handle the shocks and vibrations associated with over-ground transportation in situations where the unit is taken to a remote location not accessible by conventional road structures. Thus, the reinforcements may allow the device to handle the shock of associated falls of a few inches up to several feet, and vibrations of transport over unpaved road or other land terrains. The container itself may include features for facilitated movement, including lockable wheels, or support features accessible by fork-lift or other device for movement of the container.

The capacity of the transportable ice-delivery device may be dependent on variables including inlet water temperature, and ambient air temperature. The lower the water temperature and the lower the ambient air temperature, the more efficiently the device may be able to perform, and thus the higher the overall production capacity. In one embodiment, the device may be capable of producing over about 1600 pounds of ice in a twenty-four hour period at temperatures greater than or about 130° F. for the inlet water temperature and ambient air temperature. In other embodiments, or at different operating temperatures, the device is capable of producing at least about 500 pounds of ice, or at least or between about 750, 1000, 1200, 1400, 1500, 1600, 1700, 1800, 1900, 2000, 2100, 2200, 2300, 2400, and about 2500 pounds of ice or more in a twenty-four hour period.

The device can be used in any environment with an available power and water source, which can be non-natural sources including supplied generators, and water tanks. The device can be operated in environments with between zero and one-hundred percent humidity. The device is operable in desert or tropic conditions and can operate under temperature conditions over about 130° F. When being used in corrosive environments, such as near salt water or where corrosive chemicals are used, the container can be galvanized to provide protection, or can alternatively be coated with materials that provide corrosion resistance. The container housing can be painted, sprayed, covered, or otherwise coated or manufactured with corrosion resistant materials, or configured with covers that provide suitable protection.

II. Cooling Machine

The technology also provides a cooling machine including closed refrigeration circuits. A primary closed refrigeration circuit may be incorporated for rejecting a primary heat load. The primary closed refrigeration circuit may include a cascade heat exchanger that operates as the condenser in a secondary closed refrigeration circuit. A secondary heat load may be transferred from a secondary refrigerant contained in the secondary closed refrigeration circuit to a primary refrigerant in the primary refrigeration circuit for rejection to the ambient.

A. Primary Refrigeration System

In some embodiments, the primary closed refrigeration circuit may be incorporated for rejecting a primary heat load in ambient conditions at about 120° F. or above. The primary heat load may be from an air-conditioning refrigeration system used to provide cool air to the container interior, or deliver some temperature controlled fluid to an interior portion of the container. The primary closed refrigeration circuit may include a primary compressor, a primary condenser, a primary expansion device, and a primary evaporation device. The primary closed refrigeration circuit also may include at least one cascade heat exchanger that is connected or fluidly coupled with the circuit between the primary expansion device and the primary compressor. The cascade heat exchanger may allow a portion of a primary refrigerant in the circuit to exchange heat loads alternative to the primary evaporation device.

Referring to FIG. 2A, a primary closed refrigeration circuit and piping diagram 200 is shown according to an embodiment of the present technology. Refrigerant piping 203, 205, 207, 209 connects the refrigeration circuit components, and in embodiments accords with a typical refrigeration cycle. For example, and using relative terms for temperature and pressure, refrigerant is discharged from primary compressor 210 into discharge line refrigerant piping 205. The refrigerant within the refrigerant piping 205 is a high pressure, high temperature gas as it enters the primary condenser 220. The primary condenser 220 rejects heat from the refrigerant, and the high-temperature vapor refrigerant is cooled of any superheat, and then condensed at constant pressure and temperature before entering refrigerant piping 207, or alternatively directly enters primary expansion device 230. The refrigerant enters the primary expansion device 230 in which the pressure and temperature drop. The resultant low-temperature, low-pressure liquid, vapor, or liquid and vapor refrigerant mixture enters refrigerant piping 209. Heat is then transferred to the refrigerant in the primary evaporation device 240, vaporizing the refrigerant. The low-temperature refrigerant vapor enters refrigerant piping 203, and is transferred to the primary compressor 210 where it is compressed back to a high-temperature, high-pressure vapor, thereby completing the refrigerant cycle.

Primary refrigeration circuit 200 also may contain refrigerant piping 235 extending to cascade heat exchanger 260. Cascade heat exchanger 260 operates comparably with the primary evaporation device 240, but absorbs heat from a secondary refrigeration system as will be described below. The amount of refrigerant that may flow to cascade heat exchanger 260 can be regulated with a solenoid valve or other valve-like device for regulating refrigerant flow. The portion of the primary refrigerant that is allowed to flow to the cascade heat exchanger rejoins the primary refrigerant system 200 prior to the primary refrigerant entering the primary compressor 210, after absorbing heat and being vaporized in the cascade heat exchanger 260. In some embodiments the primary refrigeration circuit 200 can have multiple additional heat exchanger systems that are fluidly separate from each other, as shown in FIG. 2C. These additional systems can each contain a cascade heat exchanger or additional heat exchanger that accepts a heat load from a secondary refrigeration circuit or fluid, as will be described in more detail below.

Primary compressor 210 can be variously sized and can contain multiple compressors. In some embodiments the compressor is a positive displacement compressor, while in others a dynamic compressor is used. The compressor can be a scroll or reciprocating type of compressor that is sized based on the system capacity, however, any type of compression device suitable for compressing a refrigerant can be used in the refrigeration circuit. In some embodiments the compressor is a digital scroll compressor sized for about 0.5 tons or more of cooling capacity, and in other embodiments is sized for about 1, 2, 3, 5, 7.5, 10, or about 15 or more tons of cooling capacity. The compressor may be capable of staging or cycling if only partial capacity is needed. In still other embodiments the compressor may be hermetically sealed to prevent liquid refrigerant from entering the compressor.

Primary condenser 220 can be sized and operated to reject a heat load based on the primary refrigeration circuit as well as one or more secondary refrigeration circuits. In some embodiments the condenser is oversized to reduce head pressure to reduce compressor electrical draw. The primary condenser can be designed to operate in any ambient condition from below about 0° F. to above about 140° F. In embodiments, the primary condenser is an air-cooled condenser that rejects heat from the primary refrigerant to the ambient air. Any suitable type of condenser coil can be used for rejecting the heat load, including fin and tube, microchannel, or combination coil. In some embodiments a microchannel design may be incorporated to reduce the overall footprint. Condenser coil sections may be positioned at angles to the condenser fans, which may allow more surface area of coil to be provided in a condensed footprint. The condenser can be made of any suitably conductive material, and can include combinations of different metals such as aluminum and copper in embodiments. In environments where there can be corrosion of the exposed condenser coils, such as near salt water or corrosive chemical plants, coated coils can be used. The coils can be coated in a protective polymer or other material that inhibits corrosion of the underlying coil while still maintaining adequate heat-transfer properties. The condenser circuit may provide an additional amount of refrigerant subcooling during operation.

The fans used in the primary condenser 220 can be any type for providing adequate airflow across the condenser coils. The blades can be pitched, scooped, forward-curved, backward-inclined, or any configuration for a desired balance of cooling and noise level. The fan blades can be of any suitable material, and can also be coated to provide corrosion resistance. The primary condenser can have multiple fans of the same or different sizing to provide more efficient cooling through staging. The fans can also be powered by any type of motor including single-speed, two-speed, or VFD. In some embodiments VFD motors are provided for each fan to provide efficient air-flow at speeds based on the ambient temperature. Thus, for ambient conditions below design for example, the condenser fans can be run at lower speeds as the head pressure falls, thereby reducing the compressor draw, or a combination of both can be utilized to increase system capacity or reduce overall energy consumption. The condenser fans in sequence with the condenser coils can be operated in different ways, and in some embodiments can be run in different configurations including blow-through and draw-through designs.

An exemplary sequence may include the use of valves, such as solenoid valves, to sequence the delivery of refrigerant to one or more condenser coils. The condensing unit 220 may include multiple condenser coils, valves, and fans configured to operate on a predetermined control scheme. An exemplary condensing unit 220 may include two solenoid valves each separately regulating refrigerant delivery to one of two condenser coils. Accordingly, depending on system pressure, the amount of heat discharged by the condenser can be regulated. A first solenoid valve may open to deliver refrigerant to a first condenser coil at a first system pressure. A second solenoid valve may open to deliver refrigerant to a second condenser coil at a second system pressure higher than the first. As system pressure continues to rise during operation, one or more condenser fans may be engaged to discharge heat. For example, a first condenser fan may engage at a third system pressure higher than the second, and a second condenser fan may engage at a fourth system pressure higher than the third. In alternative designs, a first condenser fan may engage prior to the second condenser coil receiving refrigerant. Any number of such operational designs may be utilized depending on the number of condenser coils, fans, etc.

The primary expansion device 230 can be any device suitable for reducing the pressure in the primary refrigeration system. In some embodiments a thermal expansion valve may be used, but in other embodiments, capillary tubes, orifice plates, float valves, electronic expansion valve, or other automatic expansion devices may be used. In certain embodiments the expansion device is sized or controlled to provide a certain amount or flow of refrigerant liquid to the primary evaporation device, or the cascade heat exchanger. In embodiments the primary expansion device can be adjusted by a control scheme to change flow conditions in response to load, pressure, liquid/vapor composition, and ambient temperature.

The primary evaporation device 240 can be any suitable device for exchanging heat and transferring it to a refrigerant or other fluid. In some embodiments a shell and tube heat exchanger is used, and in other embodiments a plate and frame heat exchanger, an adiabatic wheel heat exchanger, a plate-fin heat exchanger, a pillow plate heat exchanger, a spiral heat exchanger, or any other type of heat exchanger is used. The heat exchanger can be run in concurrent or countercurrent flow, and can include multiple refrigerant/fluid passes. In one embodiment a direct-expansion evaporator coil that can be, for example, a fin and tube heat exchanger is used with a fan to provide cool air to the cooling machine interior. The evaporation device 240 may include more than one fan that can be staged or run in various configurations to provide cooling as required. The unit may additionally be configured to operate in a heating mode, and may include one or more heating devices, such as electric heaters, to provide transferable heat.

Various other system components or accessories can be used in the primary refrigeration circuit. Some examples of the devices include driers, oil separators, solenoids, sight glasses, bypass valves and tubes, flow-measurement devices, temperature-measurement devices, pressure-measurement devices, subcoolers, preheaters, superheaters, free-air exchangers, relief valves, regulators, fans, pumps, recovery wheels or any other known or useful devices for efficient operation of the refrigerant circuit.

The primary refrigerant can be any substance that can be condensed and evaporated in the primary refrigerant system. In some embodiments the refrigerant is chosen for its boiling and condensation temperatures for high-ambient applications, and accordingly, for some design conditions certain refrigerants may be used over others due to the elevated ambient that would affect operational characteristics. The refrigerant can be an HFC, a CFC, an HCFC, or any other substance or blend, and may be azeotropic or zeotropic. Examples of refrigerants that can be used in the primary refrigerant circuit include, as designated by ASHRAE, R-11, R12, R-12B1, R-13, R-13B1, R-14, R-21, R-22, R-23, R-30, R-31, R-32, R-40, R-41, R-50, R-113, R-114, R-115, R-116, R-123, R-124, R-125, R-134a, R-141b, R-142b, R-143a, R-152a, R-170, R-E170, R-218, R-227ea, R-236fa, R-245fa, R-290, R-C318, R-600, R-600a, R-601, R-601a, R-610, R-611, R-620, R-630, R-631, R-702, R-704, R-717, R-718, R-720, R-728, R-732, R-740, R-744, R-744A, R-764, R-1150, and R-1270.

Examples of refrigerant blends that can be used in the primary refrigerant circuit include, as designated by ASHRAE, R-400, R-401A, R-401B, R-401C, R-402A, R-402B, R-403A, R-403B, R-404A, R-405A, R-406A, R-407A, R-407B, R-407C, R-407D, R-407E, R-408A, R-409A, R-409B, R-410A, R-410B, R-411A, R-411B, R-412A, R-413A, R-414A, R-414B, R-415A, R-415B, R-416A, R-417A, R-418A, R-419A, R-420A, R-421A, R-421B, R-422A, R-422B, R-422C, R-422D, R-423A, R-424A, R-425A, R-426A, R-427A, R-428A, R-429A, R-430A, R-431A, R-432A, R-433A, R-433B, R-433C, R-434A, R-435A, R-436A, R-436B, R-437A, R-438A, R-500, R-501, R-502, R-503, R-504, R-505, R-506, R-507A, R-508A, R-508B, R-509A, R-510A. In some embodiments, the primary refrigerant is R-410A.

B. Secondary Refrigeration System

The cooling machine may also incorporate a secondary closed refrigeration circuit for rejecting a second heat load. In embodiments, the secondary heat load is transferred from an ice-production device. The secondary closed refrigeration circuit may include a secondary compressor, a secondary condenser, a secondary expansion device, and a secondary evaporation device. The cascade heat exchanger incorporated in the primary refrigeration circuit may operate as the secondary condenser to transfer a secondary heat load from the secondary closed refrigeration circuit. The secondary heat load carried by a secondary refrigerant contained within the secondary refrigeration circuit may transfer the heat load to the primary refrigerant at the cascade heat exchanger. Once transferred, the secondary heat load may be rejected from the primary refrigeration circuit through the primary condenser.

Figure 2B:
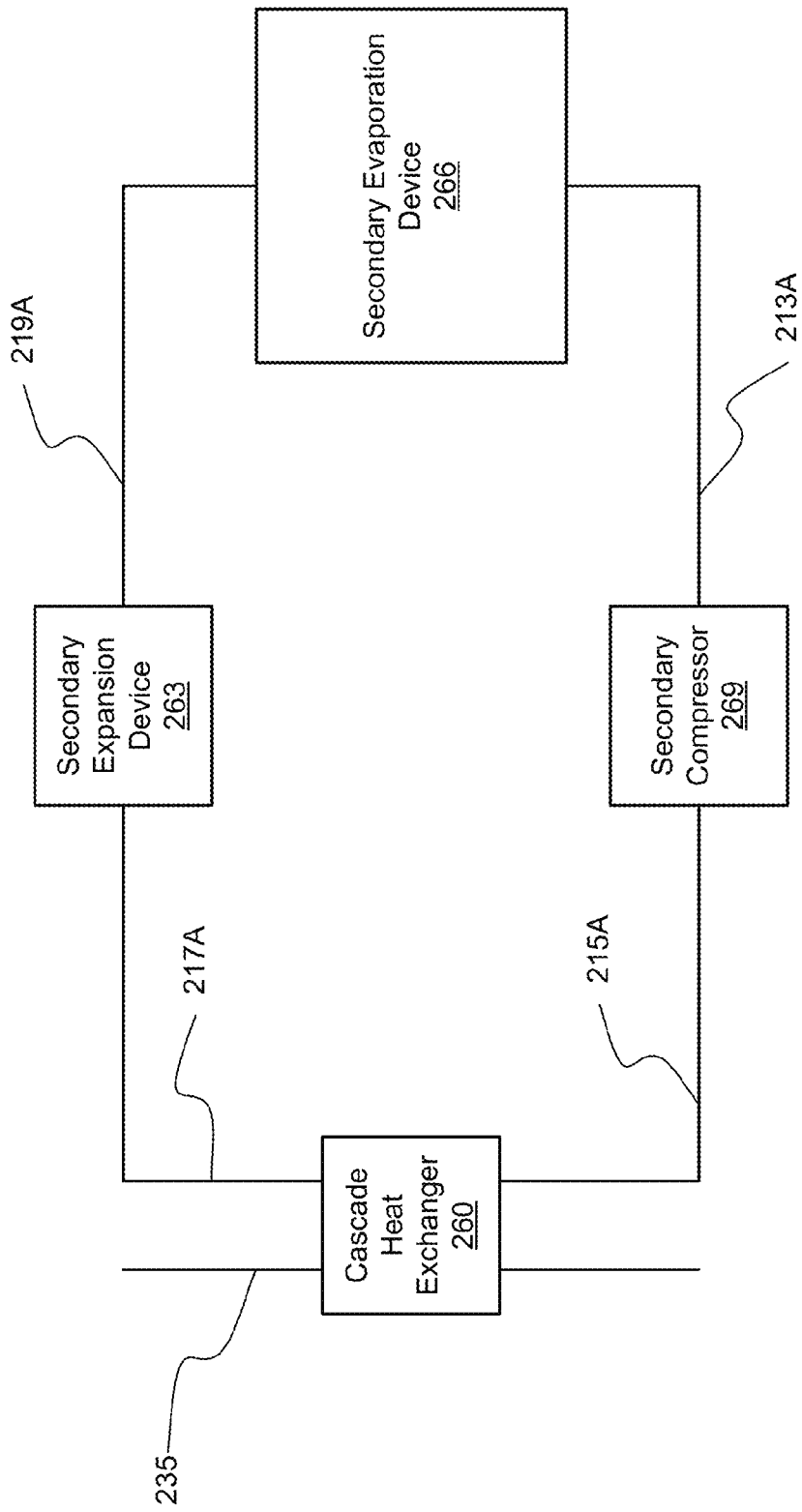
FIG. 2B shows a box diagram and piping schematic of a secondary refrigeration circuit according to embodiments of the present technology.
Figure 2C:
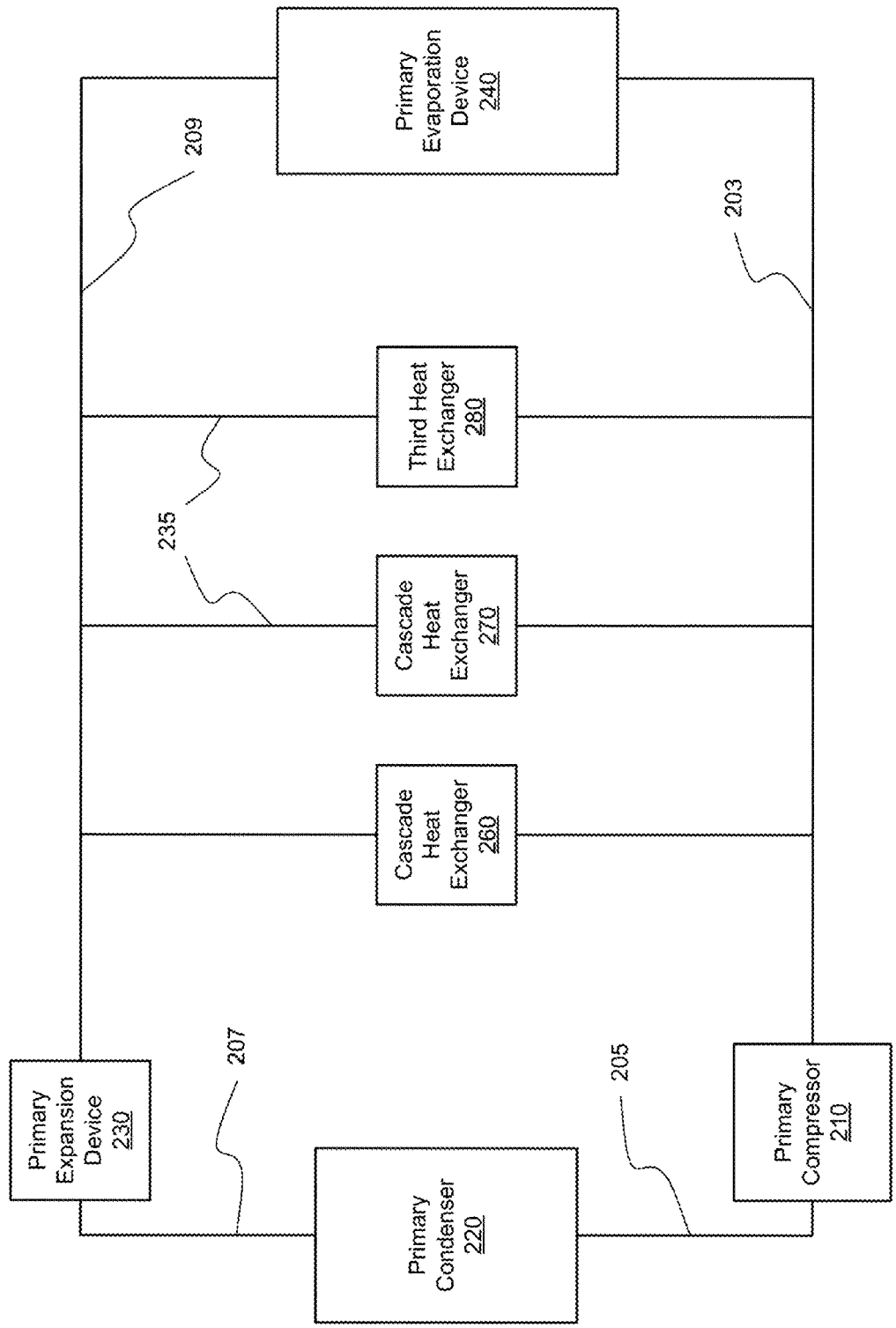
FIG. 2C shows another box diagram and piping schematic of a primary refrigeration circuit according to embodiments of the present technology.

Referring to FIG. 2B, a secondary refrigeration circuit and piping diagram is shown according to embodiments of the present technology. The secondary refrigerant passes through refrigerant piping 213A, 215A, 217A, 219A, as it moves through a similar refrigeration cycle as described above. Low-temperature, low-pressure refrigerant vapor moves in refrigerant piping 213A to the secondary compressor 269. Secondary compressor 269 compresses the refrigerant to a high-temperature and high-pressure gas that passes through refrigerant piping 215 prior to entering cascade heat exchanger 260. The cascade heat exchanger 260 rejects the secondary heat load to the cooler refrigerant in the primary refrigeration circuit 200, as the secondary refrigerant is condensed into a high pressure liquid. The secondary refrigerant can pass through refrigerant piping 217A or directly into secondary expansion device 263 where the pressure may be reduced to form a low-pressure refrigerant mixture, that may be vapor, liquid, or some combination. The secondary refrigerant passes through refrigerant piping 219A before entering into secondary evaporation device 266, where it is evaporated as it accepts the secondary heat load. The low-temperature, low-pressure gas is transferred to refrigerant piping 213A, thereby completing the secondary refrigeration circuit.

Secondary compressor 269 can be any of the compressor devices previously described. In some embodiments, secondary compressor 269 is a scroll compressor. Secondary expansion device 263 can be any type of expansion device as previously described, and in some embodiments is a thermal or thermostatic expansion valve.

Cascade heat exchanger 260 operates as the secondary condenser. In this relationship, the primary refrigerant in the primary refrigeration circuit, which is at low temperature and low pressure, absorbs heat from the secondary refrigerant, which is at high temperature and high pressure. This transfers the secondary heat load from the secondary refrigeration circuit into the primary refrigeration circuit for rejection to ambient air. Advantageously, utilizing this system relationship allows the secondary heat load to be rejected at much higher ambient temperatures, while preserving the enthalpy in the secondary refrigeration circuit with the secondary refrigeration system. Cascade heat exchanger 260 can be any type of heat exchanger as previously described, and in some embodiments is a brazed-plate heat exchanger.

Secondary evaporation device 266 can be any of the evaporation devices previously described. In some embodiments secondary evaporation device 266 is a fluid-to-fluid, or other heat exchanger that is incorporated in an additional refrigeration system, and in other embodiments the secondary evaporation device is the evaporation device for the device for which the secondary refrigeration circuit is used. In some embodiments, the secondary evaporation device contains a manifold that delivers the cool liquid secondary refrigerant for freezing water. In some embodiments the secondary refrigerant cools a glycol solution for creating a cooling slurry, and in other embodiments the secondary refrigerant is used to create ice from cascaded or otherwise delivered water into a tray or other support for holding ice with the secondary evaporation device, or by directly flowing water over the secondary evaporation device.

The secondary refrigerant can be any of the previously described refrigerants and can be a single refrigerant or an azeotropic or zeotropic blend. In some embodiments the secondary refrigerant is R-404A As shown in FIG. 2C, which shows another embodiment of a primary refrigeration circuit according to embodiments of the technology, a primary refrigeration circuit can have more than one bypass refrigerant line 235 that includes a cascade heat exchanger, and can include at least two cascade heat exchangers. For example, FIG. 2C shows a primary refrigeration circuit in which a first cascade heat exchanger 260, a second cascade heat exchanger 270, and a third cascade heat exchanger 280 are used for accepting heat loads from a secondary, third, and/or fourth refrigeration circuit. In other embodiments, the primary refrigeration circuit includes additional refrigerant lines that include a cascade heat exchanger for accepting heat loads from a second and third refrigeration circuit.

Figure 2D:
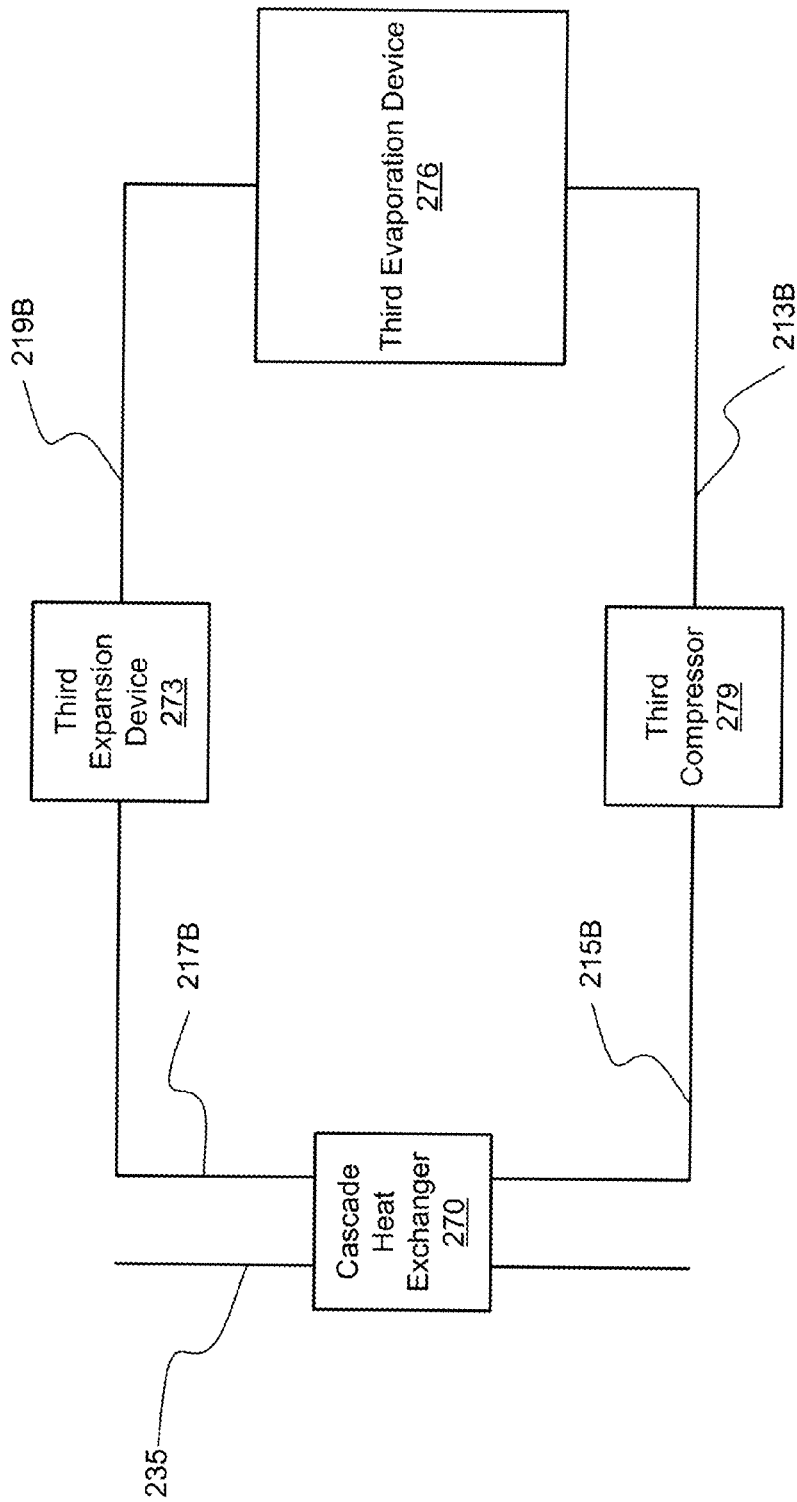
FIG. 2D shows another box diagram and piping schematic of a third refrigeration circuit according to embodiments of the present technology.

FIG. 2D shows an example of a third closed refrigeration circuit that can be connected with a primary refrigeration circuit as shown in FIG. 2C at the cascade heat exchanger 270. The third refrigeration circuit can be run similarly to the secondary refrigeration circuit, and may include a third compressor 279, a third expansion device 273, and a third evaporation device 276, along with refrigerant piping 213B, 215B, 217B, 219B. The third closed refrigeration circuit may be fluidly isolated from the primary and secondary closed refrigeration circuits, and in embodiments is used for cooling an ice-storage device for holding the produced ice. The second cascade heat exchanger 270 operates as a third condenser to transfer a third heat load from a third refrigerant in the third closed refrigeration circuit to the primary refrigerant in the primary refrigeration system to be rejected via the primary condenser. The third compressor can be any of the compressors previously described, and in one embodiment is a scroll compressor. The second cascade heat exchanger can be any of the heat exchangers as previously described, and in one embodiment is a brazed-plate heat exchanger. The third expansion device can be any of the expansion devices previously described, and in one embodiment is a thermal expansion valve. The third evaporation device may be any of the evaporation devices previously described, and in one embodiment can be a direct expansion evaporation device on which air is blown to produce cold air. The third refrigerant can be any of the refrigerants previously described, and in one embodiment the third refrigerant is R-404A.

Figure 2E:
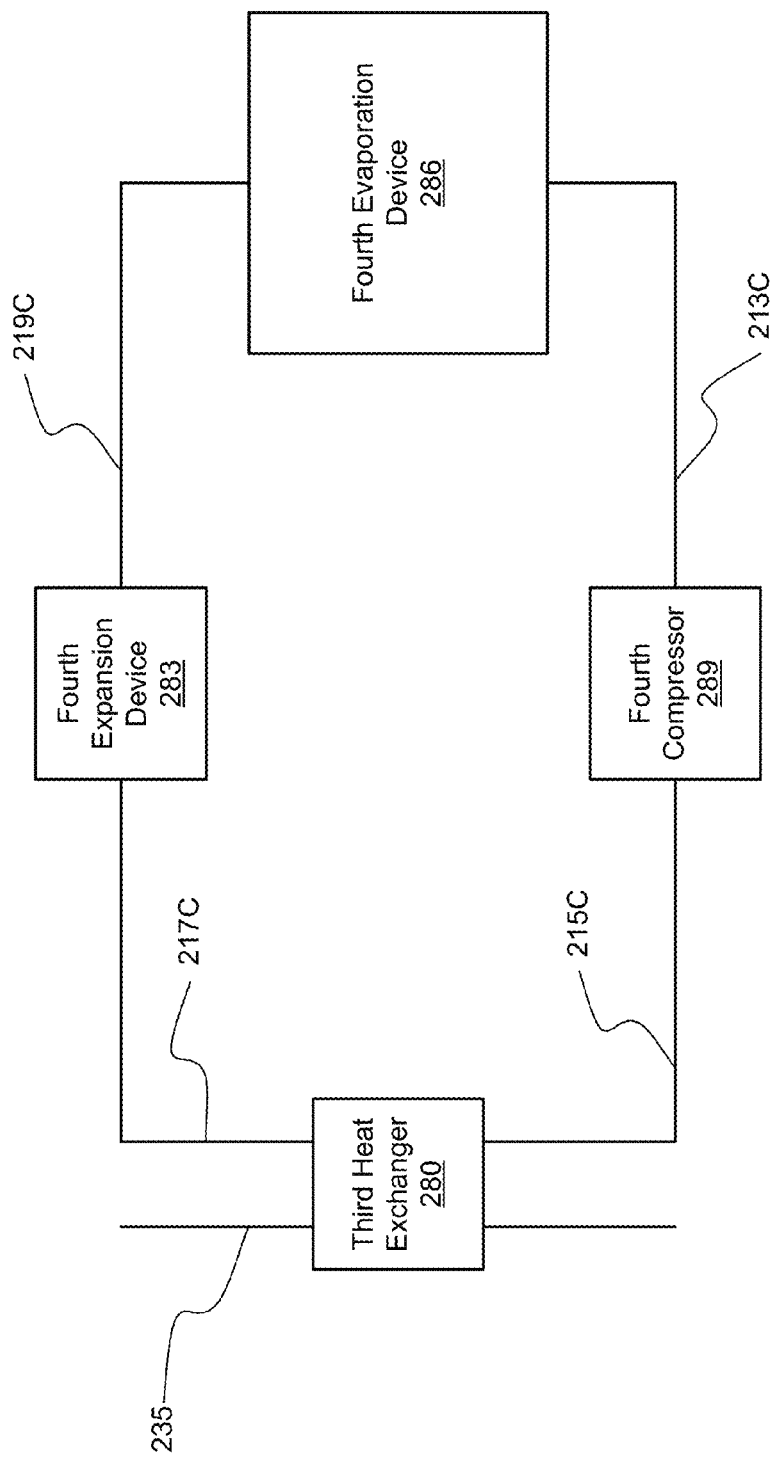
FIG. 2E shows another box diagram and piping schematic of a fourth refrigeration circuit according to embodiments of the present technology.

FIG. 2E shows an example of a fourth closed refrigeration circuit that can be connected with a primary refrigeration circuit as shown in FIG. 2C at third heat exchanger 280. The fourth refrigeration circuit can be run similarly to the secondary refrigeration circuit, and may include a fourth compressor 289, a fourth expansion device 283, and a fourth evaporation device 286, along with refrigerant piping 213C, 215C, 217C, 219C. The fourth closed refrigeration circuit may be fluidly isolated from both the secondary closed refrigeration circuit and the third closed refrigeration circuit, and in embodiments is used with a water cooling device, or for cooling water that is delivered to the ice-production device, or that is used in the production of the ice. The third cascade heat exchanger 280 operates as the fourth condenser to transfer a fourth heat load from a fourth refrigerant in the fourth closed refrigeration circuit to the primary refrigerant in the primary refrigeration system to be rejected via the primary condenser. In one embodiment, the third heat exchanger is a brazed-plate heat exchanger. The fourth compressor can be any of the compressors previously described, and in one embodiment is a scroll compressor. The fourth expansion device can be any of the expansion devices previously described, and in one embodiment is a thermal expansion valve. The fourth evaporation device may be any of the evaporation devices previously described, and in one embodiment can be a direct expansion evaporation device on which air is blown to produce cold air. The fourth refrigerant can be any of the refrigerants previously described, and in one embodiment the fourth refrigerant is R-404A.

Figure 2F:
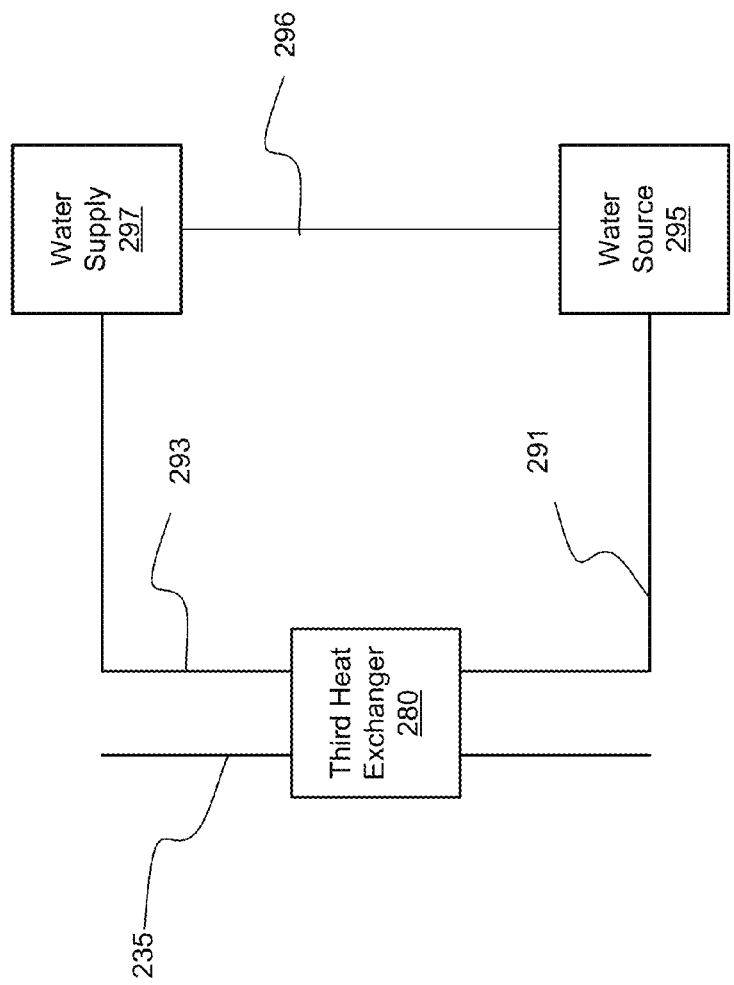
FIG. 2F shows a box diagram and a piping schematic of a water supply circuit and piping schematic for delivering tempered water to an ice-production device according to embodiments of the present technology.

FIG. 2F shows a box diagram and a piping schematic of an alternative water-supply circuit and piping schematic for delivering tempered water to an ice-production device. The water supply circuit can be connected with a primary refrigeration circuit as shown in FIG. 2C at the heat exchanger 280. Heat exchanger 280 may be a direct expansion device utilized to cool water via energy transfer from the evaporation of primary refrigerant. This water supply circuit can be a fourth circuit that is fluidly isolated from the secondary and third closed refrigeration circuits. The fourth circuit can include a fourth primary heat exchanger where the third heat exchanger 280 operates as the fourth primary heat exchanger to transfer a fourth heat load from the fourth circuit to the primary refrigerant for rejection from the primary closed refrigeration circuit through the primary condenser. The fourth circuit can include a water source 295 that provides water or some other fluid to be cooled, and may also be fluidly coupled with an ice-production device. The water may pass through piping 291 to enter the third heat exchanger 280 where the water is cooled by the primary refrigerant in the primary refrigeration circuit. The tempered water or water source may flow through piping 293 and may be held in a water supply 297 prior to being delivered to an ice-production device (not shown).

In other embodiments piping 293 supplies cooled or tempered water directly to the ice-production device (not shown). In another embodiment, the water source 295 runs in a continuous system through the third heat exchanger 280 to further cool the water by running the water through the third heat exchanger 280 one or more times. In such an embodiment, water source 295 can be monitored with a temperature monitoring device, and when the temperature of the water in the water source 295 is at a predetermined temperature, the ice-production device can draw water from the water source with additional piping. The water supply circuit can additionally contain pumps, valves, filters, or any of the circuit accessories as previously described. The third heat exchanger 280 can be any type of heat exchanger previously described, and in one embodiment is a brazed-plate heat exchanger. In another embodiment, the third heat exchanger 280 is a shell-and-tube heat exchanger. The shell-and-tube heat exchanger can include baffles to direct the water flow, knurled tubes for better heat exchange, multiple passes, concurrent or countercurrent flow, etc. A bypass piping line 296 can be included for situations in which the water source 295 is at a suitable temperature for delivery to the ice-production device. When the temperature of the water source 295 is acceptable, bypass line 296 can be used to bypass the third heat exchanger 280 and conserve system energy. Additionally, a bypass line (not shown) can allow the water supply to directly flow through heat exchanger 280 for multiple passes of cooling.

The primary refrigeration circuit as shown in FIG. 2C may be operated with each of the heat exchangers 260, 270, 280 operating concurrently. As shown in FIG. 2C, the cascade heat exchangers are run in parallel fashion. As one example of an embodiment, and not to limit the technology in any way, the primary refrigerant that flows through cascade heat exchanger 260 in this parallel design would not also enter either cascade heat exchanger 270, or third heat exchanger 280. Thus, separate portions of the primary refrigerant would flow to the secondary exchangers and accept a heat load through these heat exchangers. This process can be run by using refrigeration components including check valves and bypass valves in order to maintain the directionality of each of the bypass systems to ensure that refrigerant does not back flow through the primary refrigeration circuit through any of the cascade heat exchangers.

Additionally, intermediate expansion valves can be utilized after the cascade heat exchangers, but prior to that portion of the primary refrigerant returning to the primary refrigeration system, in order to regulate different amounts of heat transfer that can occur at the different cascade and primary evaporation device heat exchangers. For example, if the cascade heat exchangers are operating at different temperatures based on the requirements of the internal system, a cascade heat exchanger in which the evaporation temperature is higher can include an expansion valve prior to being mixed with the portion of primary refrigerant that evaporated at a lower evaporation temperature in a different cascade heat exchanger.

In other embodiments, the cascade heat exchangers are run in series either through a piping design or through the use of bypass valves. In some embodiments, the bypass to any cascade heat exchanger can be shut down when not needed for a more efficient system operation. The bypass refrigerant piping 235 can include solenoid valves or other types of valves for stopping the flow of refrigerant through the bypass refrigerant piping. For example and not to limit the technology, when the water source is at a sufficiently low temperature to not require cooling, primary refrigerant flow to heat exchanger 280 can be stopped, while primary refrigerant is still bypassed to cascade heat exchangers 260 and 270. Of course, it will be understood by one of skill in the art that many other control and bypass scheme possibilities are available, all of which are encompassed by the present technology.

1. Ice-Production System

The secondary closed refrigeration system can be an ice-production system in some embodiments. The system can directly make ice, or can provide a system with which freezing temperatures can be maintained including, for example, slurries or baths that can be of any material with a substantially low freezing point including glycol that can be fed to other systems. The ice production system can use refrigerant temperatures in the secondary evaporation device below about 30° F., and in other embodiments uses refrigerant at temperatures below about 25 degrees, 20, 15, 10, 5, 0, −5, −10, −20, −30, −40, or about −50° F. or lower. The ice-production system may additionally include a mechanism to flush an internal water reservoir to reduce contaminants and particulates. The mechanism may be adjustable to flush the water reservoir after a predetermined number of ice production cycles. For example, after every second, fifth, tenth, etc. or any other number of production cycles, the reservoir may be expelled to a drain system that removes the waste water from the ice-production system as well as the overall unit. Depending on the environment in which the cooling machine is located, the ambient temperature around the cooling machine can be above about 130° F. or more. Advantageously, by utilizing a cascade refrigeration system, the compressor does not need to be sized for such a temperature difference, and a greater amount of cooling capacity can be realized.

The water used for the ice-production system can be from any available source including water tanks, rivers, lakes, oceans, etc. Depending on the water source, desalinization, filtration, and other water treatment can be performed prior to delivering the water to the ice-production machine. In one embodiment, the water from any source may be made potable prior to being delivered to the ice-production system by a combination of treatment techniques that can include reverse osmosis, ultra-violet filtration, etc. In some embodiments the water is pre-cooled prior to delivery to the ice-production system. Providing cooler water can increase the capacity of the ice-production system by requiring less time to make sufficient ice.

The ice produced by the ice-production system can be made in any form as required by the operation. For example, the ice-production system can make ice in different forms including cube, cubelet, round, nugget, top-hat, tube, cracked, crushed, flake, or block ice.

In embodiments where ice is formed by cascading water over the secondary evaporation device, the ice can be freed from the secondary evaporation device after the desired size and shape of ice has been formed. In one embodiment, ice can be freed with bypass gas from the secondary compressor. The hot discharge gas from the secondary compressor can be run through the evaporator tubing to raise the temperature. Once the tube is warm enough, the interface between the ice and the secondary evaporation device will melt and release the ice. In other embodiments the weight of the produced ice causes it to dislodge, and in other embodiments the ice is dislodged mechanically by the ice-production device.

2. Ice-Storage Device

The third closed refrigeration system can be used to cool a merchandiser or other ice-storage device in one embodiment. The third closed refrigeration system can include a fan for delivering cool air into the merchandiser to maintain a specific temperature. In some embodiments the temperature in the merchandiser is maintained below about 32° F. to ensure that the ice does not melt. In other embodiments the merchandiser is maintained below about 30° F., 27, 23, 20, 17, 13, 10, 7, 5, 3, 0, −2, −5, −10, −15, −20, or about −25° F. or lower.

As previously described, the merchandiser has two openings. The first opening can be compatible for removing bags of ice, and can include strip seals to minimize temperature loss from the door. The merchandiser can also include any extra seals or insulation useful to maintain the temperature inside the device.

3. Fluid-Cooling Device

A fourth circuit can be used to provide a tempered or cooled fluid for use in ice production in embodiments. The fourth circuit can be a closed refrigeration system in some embodiments, and can be a water system in other embodiments. A fourth closed refrigeration system can be used to provide cooling directly to a water source tank, or to a subsequent fourth evaporation device to provide cooling energy to the source water. The refrigerant can be run through a water source in a variety of ways to remove heat from the water prior to its use in the ice-production device.

In another embodiment, water or another fluid is directly flowed through a third heat exchanger to remove heat prior to directing the water to an ice-production system. The water can be pumped, gravity drawn from a water tower, or otherwise flowed through the third heat exchanger to cool the water. The water may first pass through a particulate filter. After the water is cooled, it can be directly flowed or pumped to the ice-production system, or alternatively can be maintained elsewhere, such as in an insulated tank for storage prior to use. For example, if the water source is unclean, a series of filtrations and treatments may be necessary prolonging the time for ice production. Allowing the system to store extra water that has been treated and cooled can provide faster ice production. Water filtration and treatments as described previously can be performed at any time and can occur prior to cooling with the third heat exchanger or after in different embodiments.

Operation of the fluid cooler may be based on a sensor that indicates that temperature of the fluid delivered to the ice-production device. For example, if the water delivered to the ice-production device exceeds a threshold temperature, a solenoid valve may open that delivers the incoming water to the third heat exchanger for pre-cooling. The threshold temperature may be predetermined, and based on the characteristics of the ice-production machine. The machine may require water that is below about 50° F. or less for ice production. Alternatively, the machine way require water that is below about 60° F., about 75° F., about 90° F., etc. or more depending on the ice-production machine. When the sensor recognizes that the threshold temperature has been reached, the sensor may provide communication to the solenoid valve to open until the temperature of the incoming water is below the required threshold temperature. The sensor may additionally instruct the engagement of the solenoid valve within a particular range. For example, the solenoid may be instructed to open to deliver water to the third heat exchanger if the inlet water temperature to the ice-production machine is above a first threshold temperature, which may be in one example, 75° F. or some temperature higher or lower than that. Once the temperature is reduced below a second threshold temperature, the solenoid may be instructed to cease delivery of water to the third heat exchanger. The second threshold temperature may be any predetermined temperature below the first threshold temperature, and may be about 70° F. or less. Alternatively, the second threshold temperature may be about 65° F. or less, about 60° F., about 55° F., about 50° F., about 45° F., etc., or less. The fluid-cooling system may additionally include a flow switch to protect against freezing any residual water in the third heat exchanger. The flow switch may monitor a water temperature set point below which the solenoid will close to protect the system.

In some embodiments the water is kept in a tank or is in a body of water, for example, and can be at a temperature comparable to the ambient temperature. In some embodiments, the water is kept in a tank that can add additional temperature when sunlight increases the temperature of the tank itself, and this can create temperatures significantly hotter than the ambient air temperature. In one embodiment, the water source can be at ambient temperatures over about 130° F. In other embodiments, the water can be over about 130, 135, 140, 145, or 150° F. or more. The third heat exchanger can, in a single pass or in multiple passes, cool the water down over about 20 degrees or more. In other embodiments, the heat exchanger can cool the water down over about 25 degrees, 30, 35, 40, 45, 50, 55, 60, 65, 70, 75, 80, 85, 90, 95, or over about 100 degrees or more.

Figure 3:
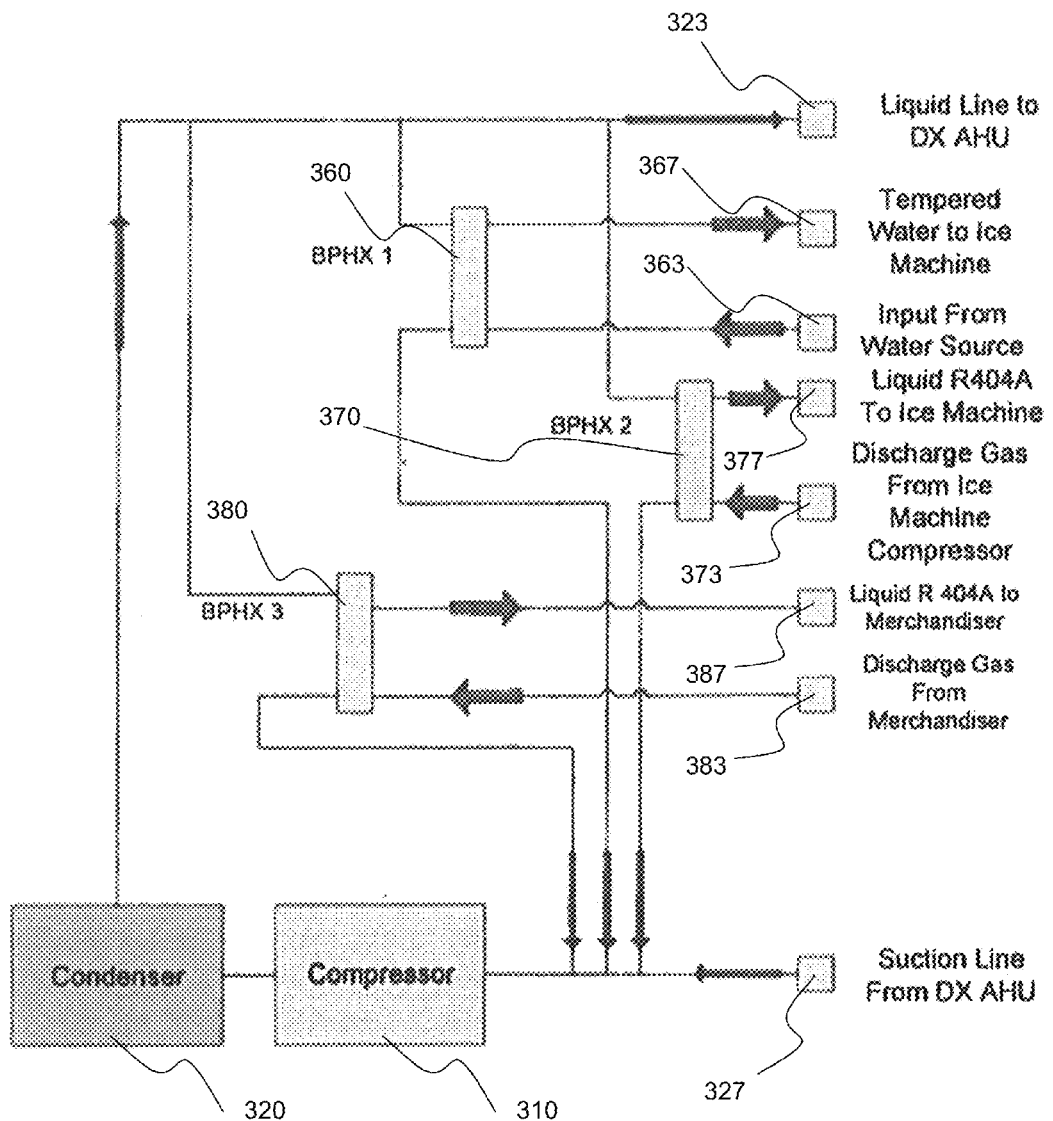
FIG. 3 shows an exemplary embodiment of a cooling machine with primary and secondary refrigeration circuits according to embodiments of the present technology.

Referring to FIG. 3, a non-limiting exemplary cooling machine with primary and secondary refrigeration circuits is shown. Several components as described above are not shown for the sake of clarity, but any system or device previously described can be incorporated within the schematic for operation. The cooling machine includes a primary refrigeration circuit with a compressor 310, and a condenser 320 for rejecting a heat load to ambient air. The condenser may be sized for rejecting heat loads from several heat sources. One heat source may be directly coupled with the compressor and condenser as shown by the liquid line 323 and suction line 327 for providing and returning a primary refrigerant for accepting a primary heat load from a direct-expansion air-handling unit used to cool the cooling machine. A portion of the primary refrigerant may flow around block 323 to the direct-expansion unit, and flow instead through a brazed-plate heat exchanger 360. This portion of the primary refrigerant absorbs heat from a water source 363 in order to provide cooled or tempered water to an ice-machine 367. After this portion of the primary refrigerant has been evaporated from the absorbed heat, it rejoins the primary refrigeration circuit after block 327 with the primary refrigerant returning from the direct-expansion unit.

A second portion of the primary refrigerant that flows past block 323 to the direct-expansion unit, and flows through a brazed plate heat exchanger 370. This portion of the primary refrigerant absorbs heat from discharge gas from an ice machine compressor 373 in order to provide condensed liquid refrigerant back to the ice machine for cooling 377. After this portion of the primary refrigerant has been evaporated from the absorbed heat, it rejoins the primary refrigeration circuit after block 327 with the primary refrigerant returning from the direct-expansion unit.

A third portion of the primary refrigerant that flows past block 323 to the direct-expansion unit, and flows through a brazed plate heat exchanger 380. This portion of the primary refrigerant absorbs heat from discharge gas from a merchandiser compressor 383 in order to provide condensed liquid refrigerant back to the merchandiser for cooling 387. After this portion of the primary refrigerant has been evaporated from the absorbed heat, it rejoins the primary refrigeration circuit after block 327 with the primary refrigerant returning from the direct-expansion unit. The combined heat loads from the primary refrigeration circuit and the three heat loads absorbed by the three portions of the primary refrigerant at the brazed-plate heat exchangers 360, 370, 380 then pass into compressor 310 to be heated to a temperature such that condenser 320 can reject the combined heat loads to the ambient air.

III. Method of Rejecting Heat

Another embodiment of the present technology provides a method of rejecting heat in a container. The method involves combining multiple heat loads produced within the container for rejection to ambient from a single condenser. The method may include transferring a first heat load in an air-conditioning refrigeration system and transferring a second heat load in a cooling refrigeration system. The method may also include removing the second heat load to the air-conditioning refrigeration system, and rejecting both the first heat load and second heat load from the air-conditioning refrigeration system to ambient air.

When the container is located outdoors, the container can be heated by the ambient environment. This in turn heats the internal space of the container. An air-conditioning refrigeration system can be included within the container in order to cool the internal space of the container. The air-conditioning refrigeration system may include a first refrigerant that cycles within the refrigeration system absorbing heat from the internal space and rejecting the heat to the ambient air outside of the container. The air-conditioning refrigeration system can include a fan that blows air from the internal space onto an evaporation device that transfers the heat from the internal space to the first refrigerant in the air-conditioning refrigeration system. The refrigerant then proceeds through a refrigeration cycle and rejects the heat to the ambient air before returning to the evaporation device.

The container can house components for providing cooling energy, and can include a cooling refrigeration system that generates and transfers a second heat load while creating cooling energy for a cooling device. The cooling refrigeration system may contain a second refrigerant different from the first refrigerant, and can provide cooling energy directly or indirectly to the cooling device. In one embodiment the cooling refrigeration system may provide the cooling device cooling energy and is incorporated within the cooling device. In another embodiment the cooling refrigeration system provides cooling energy to an intermediate fluid, for example, that can be flowed or routed in communication with the cooling device to transfer the cooling energy from the cooling refrigeration system to the cooling device. In other embodiments the second refrigerant is the same as the first refrigerant.

A cascade heat exchanger may be used to remove the second heat load from the cooling refrigeration system. The cascade heat exchanger can be in fluid communication with both the air-conditioning refrigeration system and the cooling refrigeration system without allowing the first refrigerant to come into fluid contact with the second refrigerant. The cascade heat exchanger can provide proximity between the first refrigerant and the second refrigerant to allow thermodynamic transfer of the heat load from the second refrigerant to the first refrigerant. Alternatively, in another embodiment the first and second refrigerants are directly mixed and contacted in the cascade heat exchanger either through direct mixing, or bubbling, or some other way of transferring the heat from one portion of the second refrigerant to a portion of the first refrigerant.

After the second heat load has been removed from the cooling refrigeration system, both the first heat load and the second heat load are contained in the air-conditioning refrigeration system. The air-conditioning refrigeration system can reject the two heat loads from the air-conditioning refrigeration system to the ambient air outside the container. Although the first heat load and the second heat load are contained within the air-conditioning refrigeration system, a similar amount of heat transfer is not necessary, and the heat loads can be of different capacities. For example and with no intention of limiting the technology, the primary heat load may involve an evaporation temperature that is different than the evaporation temperature of evaporation in the cascade heat exchanger, and thus the mixing of the two portions of the first refrigerant can be metered or throttled prior to their being combined by utilizing an intermediate expansion device in the portion of the air-conditioning refrigeration system that has an evaporation temperature that is higher than the evaporation temperature of other systems incorporated with cascade heat exchangers, or vice versa.

In other embodiments the method involves combining more heat loads produced within the container for rejection to ambient from a single condenser. In addition to transferring a first heat load and a second heat load, the method can include transferring a third heat load with a fluid-cooling system. In still other embodiments, the method can also include transferring a fourth heat load with a second cooling refrigeration system. The method also may include removing the third heat load and in other embodiments the fourth heat load to the air-conditioning refrigeration system, and rejecting both the third heat load and the fourth heat load along with the first heat load and second heat load from the air-conditioning refrigeration system to ambient air.

The container additionally can house components for providing fluid-cooling, and can include a fluid-cooling system that generates and transfers a third heat load while cooling water or an additional fluid for use in the cooling device. The fluid-cooling system may contain a third refrigerant different from the first refrigerant in some embodiments, and can provide cooling directly or indirectly to a water source, or a subsequent fluid-cooling device. In one embodiment the fluid-cooling system is thermodynamically coupled with a water source in order to cool it prior to its use in the cooling device. In another embodiment the fluid-cooling system flows water from a water source directly for heat transfer of the third heat load contained in the water, which is at a temperature that is higher than a desired temperature, to the primary refrigerant with the cascade heat exchanger. In other embodiments the third refrigerant is the same as the first refrigerant, if used.

The container additionally can house components for cooling an isolated space of a second cooling device within the internal space of the container, and can include a second cooling refrigeration system that transfers a fourth heat load while cooling the isolated space within the internal space. The second cooling refrigeration system contains a fourth refrigerant different from the first refrigerant, and can provide cooling directly or indirectly to the isolated space. Depending on whether the fluid-cooling system utilizes a refrigerant or not, the fourth refrigerant may alternatively be a third refrigerant if the fluid-cooling system is used to directly cool a water or other fluid source. In one embodiment the second cooling refrigeration system cycles the fourth refrigerant within the second air-conditioning refrigeration system absorbing heat from the isolated space. The second cooling refrigeration system can include a fan that blows air from the isolated space onto an evaporation device that transfers the heat from the isolated space to the fourth refrigerant in the second cooling refrigeration system transferring the fourth heat load. In other embodiments, the fourth refrigerant is the same as the first refrigerant.

A third heat exchanger separate from the cascade heat exchanger connected with the cooling refrigeration system may be used to remove the third heat load from the fluid-cooling system. The third heat exchanger can be in fluid communication with both the air-conditioning refrigeration system and the fluid-cooling system without allowing the first refrigerant to come into fluid contact with either the third refrigerant or the fluid. A second cascade heat exchanger separate from the cascade heat exchanger connected with the first cooling refrigeration system and the third exchanger connected with the fluid-cooling system may be used to remove the fourth heat load from the second cooling refrigeration system. The second cascade heat exchanger can be in fluid communication with both the air-conditioning refrigeration system and the second cooling system without allowing the first refrigerant to come into fluid contact with the fourth refrigerant. In other embodiments a second heat exchanger is used with the cascade heat exchanger for a first heat load, a second heat load, and a third heat load, where there is no fourth heat load.

The first heat load, second heat load, third heat load, and fourth heat load in some embodiments, contained in the air-conditioning refrigeration circuit can be rejected from the container to the outside ambient air. Similarly as explained above, although the first heat load, the second heat load, the third heat load, and in some embodiments the fourth heat load are contained within the air-conditioning refrigeration system, a similar amount of heat transfer is not necessary, and the heat loads can be of similar or differing capacities and/or temperatures.

IV. Control Scheme

A control scheme and apparatus can be used to provide operation and control over the constituent systems of the cooling machine or transportable ice-delivery device. In some embodiments a mountable control panel can be incorporated into the container that is operable from outside the container. The control panel can be mounted flush with the container or cooling machine such that it does not protrude beyond the dimensions of the device. The control panel can include, for example, a computer or other system for operating valves, compressors, evaporation device fans, condenser device fans, as well as accessories. The computer system can include software programming for regulating refrigerant flow between the bypass systems in the primary refrigeration circuit, as well as each of the expansion devices incorporated in the several systems.

The computer system can be in communication with temperature-measuring devices, pressure-measuring devices, flow-measuring devices, etc., and can include algorithms to calculate optimum operating conditions based on the obtainable measurements. For example, under lower ambient conditions a temperature-measuring device that measures the ambient air temperature can provide this information to the control system. The control system can then stage or regulate condenser fans based on calculations that determine the needed amount of air-flow across the condenser to reject the heat load under this ambient condition. If the ambient temperature is low enough, one or more of multiple condenser fans can be turned off to conserve energy. This determination can be based on prior operational data that can determine to stop a fan that was not stopped under similar conditions previously. In this way, the system can regulate the run time of each fan in order to maximize the useful life of the original device components.

As an additional example, the water temperature in the water source for the ice-production device can be monitored to determine whether additional cooling and/or how much cooling is needed. When the temperature of the water source is determined to be at a suitable temperature for use in the ice-production device, a bypass valve can be opened and a bypass piping line can be used to bypass the cascade heat exchanger and thus improve system efficiency by utilizing less input power. In an embodiment the control system can also monitor system pressures and temperatures to determine whether unsafe operating conditions are occurring and determine whether the system should be shut down, or whether a relief valve should be opened to vent the system. In another embodiment in which a blend refrigerant is being used, the control system can monitor the blend components for optimum refrigerant proportions. If a suboptimal level of one or more constituent refrigerants is determined, a signal, message, or other notification can be provided to top-off or adjust the refrigerant composition. In more advanced systems and devices that include tanks of constituent refrigerants, the system can top-off refrigerant components automatically.

The control system can also monitor each individual system, along with associated temperatures, for determining a proper start-up sequence under different conditions. For example, if the cooling machine has been idle for a period of time, the merchandiser may have floated to a temperature significantly above operating temperature. The control system can recognize this and upon system start-up, can begin with the cooling system for the merchandiser prior to initiating the ice maker, so that the merchandiser interior temperature is below at least about 32° F. before ice is delivered. This prevents the delivered ice from melting prior to use. Additionally, the system can recognize that the water temperature is well above a threshold required for the ice maker, and on start-up can begin cooling the water source prior to initiating the ice maker. Many other control processes can occur, and are envisioned for and operable by the technology for different conditions including head-pressure control, when on start-up the primary evaporators are at an internal temperature that is higher than the internal condenser temperature. These controls and programs can both save energy for the system, and prevent wasted product from melting prior to use.

The control system may be based on a particular sequence of operation for starting and stopping the operation of each component. An exemplary sequence is described here for illustration purposes, and is not meant to limit the technology in any way. When power is connected to the system, the control system may be configured to receive an instruction to begin ice production. The primary compressor may be engaged by the control system. As system pressure rises, primary condenser unit operation may begin based on predetermined threshold pressures. The control system may engage solenoid valves and condenser fans to begin heat rejection as described previously. After a time delay from engagement of the condenser unit, the primary air-handling unit may be engaged for operation. Depending on the intended use of heating or cooling, other equipment located with the air-handling unit may also be engaged. After a subsequent time delay, the merchandiser may be activated to begin a process of cooling the merchandiser internal temperature. After the merchandiser internal temperature is below a threshold temperature, the ice maker and bagger system may be engaged for ice production. The ice production cycle may begin with the ice maker being instructed to fill an internal reservoir used in ice production. After a batch of ice has been produced, it may be harvested and delivered to the hopper of the bagger. The bagger may be engaged to deliver ice to a collection bag which is then filled. The bagger may continue to bag ice until an internal sensor system determines that sufficient ice is no longer in the hopper. Once a bag is filled, a sensor triggers a heat seal mechanism to seal the bag, which may then be released by a solenoid and delivered to a transport belt. The transport belt may be engaged just prior to receiving the bag of ice to ensure the bag of ice falls prone onto the belt for movement below the bagger. The transport belt may deliver the bag of ice to the elevator which is then engaged to deliver the bag to the merchandiser. The control system may include system fault alarms, and control of all ancillary pumps, valves, and other devices in the system. The control system may be computer operated, and may include any of the features as described below.

Figure 4:
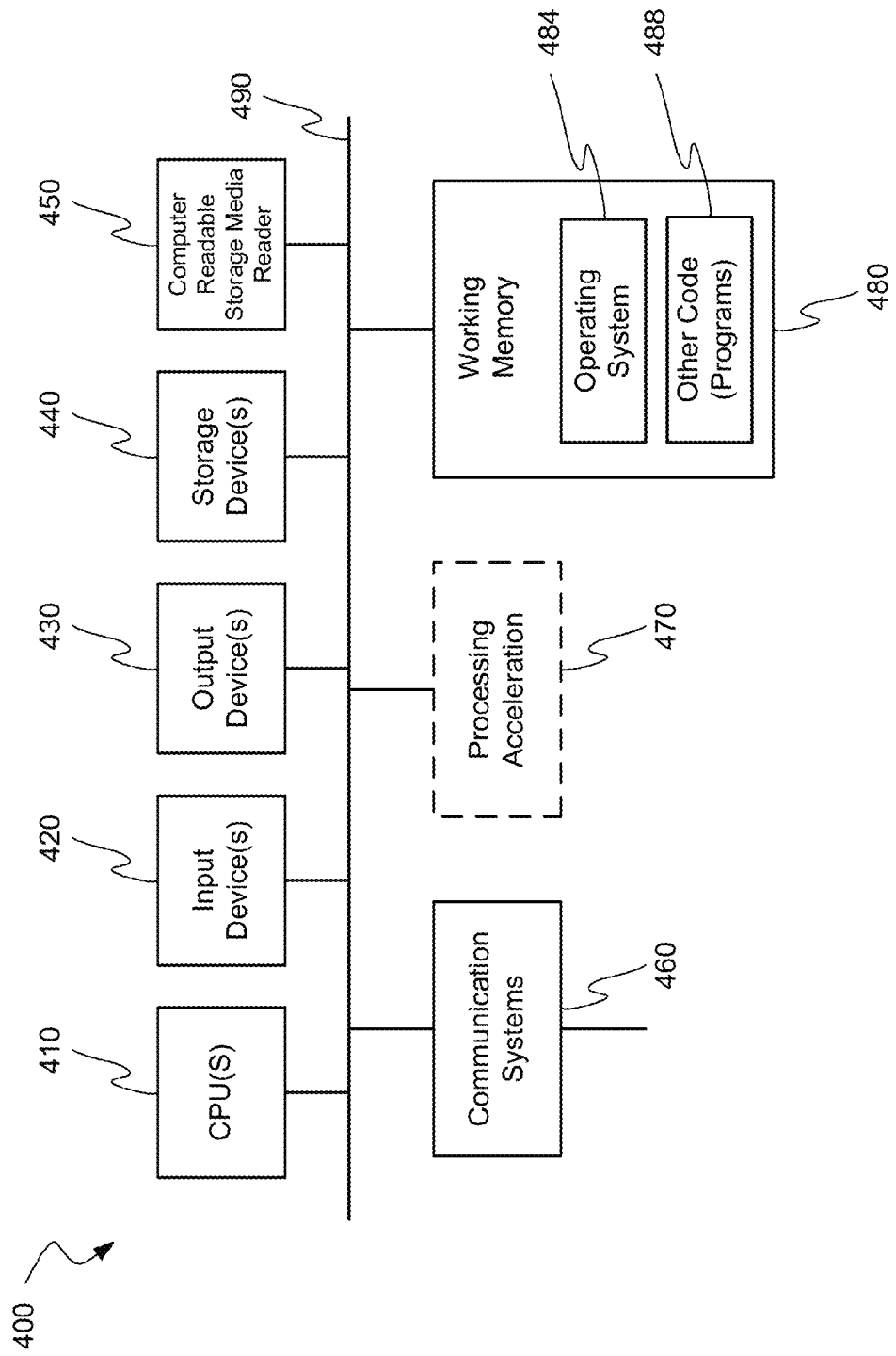
FIG. 4 shows a simplified block diagram of a computer system capable of being used in at least some portion of the processes of the present technology, or for implementing at least some portion of the functions of the present technology.

FIG. 4 is a block diagram illustrating an exemplary computer system 400 that may be utilized as or in conjunction with the control system or any particular apparatus. This example illustrates a computer system 400 such as may be used, in whole, in part, or with various modifications, to provide the functions of fan control, valve control, temperature monitoring, pressure monitoring, and/or control of other components of the technology such as those discussed above. For example, various functions of the method for rejecting heat may be controlled by the computer system 400, including, merely by way of example, monitoring ambient temperature, determining that reduced condenser capacity is required, and reducing fan speed or shutting off a fan, etc.

The computer system 400 is shown comprising hardware elements that may be electrically coupled via a bus 490. The hardware elements may include one or more central processing units 410, one or more input devices 420 (e.g., a mouse, a keyboard, etc.), and one or more output devices 430 (e.g., a display device, a printer, etc.). The computer system 400 may also include one or more storage device 440. By way of example, storage device(s) 440 may be disk drives, optical storage devices, solid-state storage devices such as a random access memory ("RAM") and/or a read-only memory ("ROM"), which can be programmable, flash-updateable and/or the like.

The computer system 400 may additionally include a computer-readable storage media reader 450, a communications system 460 (e.g., a modem, a network card (wireless or wired), an infra-red communication device, Bluetooth™ device, cellular communication device, etc.), and working memory 480, which may include RAM and ROM devices as described above. In some embodiments, the computer system 400 may also include a processing acceleration unit 470, which can include a digital signal processor, a special-purpose processor and/or the like.

The computer-readable storage media reader 450 can further be connected to a computer-readable storage medium, together (and, optionally, in combination with storage device(s) 440) comprehensively representing remote, local, fixed, and/or removable storage devices plus storage media for temporarily and/or more permanently containing computer-readable information. The communications system 460 may permit data to be exchanged with a network, system, computer and/or other components described above.

The computer system 400 may also comprise software elements, shown as being currently located within a working memory 480, including an operating system 484 and/or other code 488. It should be appreciated that alternate embodiments of a computer system 400 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 400 may include code 488 for implementing any or all of the function of the various elements of the architecture as described herein. For example, software, stored on and/or executed by a computer system such as system 400, can provide the functions of controlling solenoid valves, adjusting compressor speed, operating condenser fans, and/or other components of the technology such as those discussed above. Methods implementable by software on some of these components have been discussed above in more detail.

In one set of embodiments, the techniques described herein may be implemented as program code executable by a computer system and may be stored on machine-readable storage media. Machine-readable storage media can include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Having disclosed several embodiments, it will be recognized by those of skill in the art that various modifications, alternative constructions, and equivalents may be used without departing from the spirit of the disclosed embodiments. Additionally, a number of well-known processes and elements have not been described in order to avoid unnecessarily obscuring the present technology. Accordingly, the above description should not be taken as limiting the scope of the technology.

It is noted that individual embodiments may be described as a process which is depicted as a flowchart, a flow diagram, or a block diagram. Although a flowchart may describe the method as a sequential process, many of the operations can be performed in parallel or concurrently, such as generating heat loads in separate subsystems, for example. In addition, the order of the operations may be rearranged. A process may be terminated when its operations are completed, but could have additional steps not discussed or included in a figure. Furthermore, not all operations in any particularly described process may occur in all embodiments. A process may correspond to a method, a function, a procedure, a subsystem, etc. When a process corresponds to a subsystem, its termination corresponds to a return of the subsystem to the main system.

As used herein and in the appended claims, the singular forms "a", "an", and "the" include plural references unless the context clearly dictates otherwise. Thus, for example, reference to "a compressor" includes a plurality of such devices, and reference to "the subsystem" includes references to one or more subsystems and equivalents thereof known to those skilled in the art, and so forth.

What is claimed is:

1. A cooling machine comprising:
a primary closed refrigeration circuit configured to reject a primary heat load in ambient conditions of about 120° F. or above, wherein the primary closed refrigeration system comprises a primary compressor, a primary condenser, a primary expansion device, a primary evaporation device, an additional heat exchanger, and a first cascade heat exchanger, and wherein the additional heat exchanger and the first cascade heat exchanger are fluidly coupled with the primary closed refrigeration circuit between the primary expansion device and the primary compressor;
a secondary closed refrigeration circuit that is fluidly isolated from the primary closed refrigeration circuit, wherein the secondary closed refrigeration circuit comprises a secondary compressor, a secondary condenser, a secondary expansion device, and a secondary evaporation device, wherein the first cascade heat exchanger is also the secondary condenser and is configured to transfer a secondary heat load from a secondary refrigerant contained in the secondary closed refrigeration circuit to a primary refrigerant in the primary closed refrigeration circuit for rejection from the primary closed refrigeration circuit through the primary condenser, and wherein the secondary closed refrigeration circuit is the refrigeration circuit for an ice maker; and
a fluid circuit that is fluidly isolated from the primary and secondary closed refrigeration circuits, wherein the fluid circuit is configured to transfer a fluid circuit heat load from water contained within the fluid circuit by the additional heat exchanger to the primary refrigerant in the primary closed refrigeration circuit for rejection from the primary closed refrigeration circuit through the primary condenser, and wherein fill water to form ice by the ice maker is the water of the fluid circuit.

2. The cooling machine of claim 1, wherein the primary closed refrigeration circuit comprises at least two cascade heat exchangers including the first cascade heat exchanger and a second cascade heat exchanger.

3. The cooling machine of claim 2, further comprising a third closed refrigeration circuit that is fluidly isolated from the primary and secondary closed refrigeration circuits, wherein the third closed refrigeration circuit comprises a third compressor, a third condenser, a third expansion device, and a third evaporation device, and wherein the second cascade heat exchanger is also the third condenser and is configured to transfer a third heat load from a third refrigerant contained within the third closed refrigeration circuit to the primary refrigerant for rejection from the primary closed refrigeration circuit through the primary condenser.

4. The cooling machine of claim 3, wherein:
the third closed refrigeration circuit includes a merchandiser.

5. The cooling machine of claim 3, wherein the primary refrigerant is R-410A, and wherein the secondary refrigerant and the third refrigerant are R-404A.

6. The cooling machine of claim 3, wherein the at least two cascade heat exchangers are brazed-plate heat exchangers.

7. The cooling machine of claim 3, wherein the at least two cascade heat exchangers are fluidly coupled with the primary closed refrigeration circuit in a parallel relationship such that a portion of the primary refrigerant that enters either cascade heat exchanger is prevented from entering the other cascade heat exchanger prior to passing through the primary condenser.

8. The cooling machine of claim 1, wherein the primary closed refrigeration circuit includes a direct-expansion air-handling unit as the primary evaporation device that is positioned within the cooling machine to deliver temperature controlled air to an interior portion of the cooling machine.

* * * * *